US010642590B2

(12) United States Patent
Siraparapu et al.

(10) Patent No.: US 10,642,590 B2
(45) Date of Patent: May 5, 2020

(54) METHOD AND ELECTRONIC DEVICE FOR RENDERING SCALABLE VECTOR GRAPHICS CONTENT

(71) Applicant: Samsung Electronics Co., Ltd., Suwon-si, Gyeonggi-do (KR)

(72) Inventors: Yamuna Siraparapu, Visakhapatnam (IN); Nuri On, Suwon-si (KR); Vivek Ramesh, Mandya Dist (IN); Jaeho Kim, Hwaseong-si (KR); Pramod Belekare Nagaraja Satya, Bengaluru (IN); Suresh Kumar Krishnankutty Vettukuzhiparambil, Changanacherry (IN); Utsav Agarwal, Gurgaon (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/017,235

(22) Filed: Jun. 25, 2018

(65) Prior Publication Data
US 2019/0004778 A1  Jan. 3, 2019

(30) Foreign Application Priority Data

Jun. 30, 2017  (IN) .............................. 201741023119
Feb. 9, 2018  (IN) .............................. 201741023119

(51) Int. Cl.
*G06F 9/45* (2006.01)
*G06F 8/51* (2018.01)
(Continued)

(52) U.S. Cl.
CPC ................. *G06F 8/51* (2013.01); *G06F 8/41* (2013.01); *G06F 8/52* (2013.01); *G06F 9/45508* (2013.01);
(Continued)

(58) Field of Classification Search
CPC ...... G06F 8/51; G06F 8/41; G06F 8/52; G06F 16/84; G06F 9/45508; G06F 17/212; G06F 17/2705; G06F 40/106; G06F 40/205
See application file for complete search history.

(56) References Cited

U.S. PATENT DOCUMENTS 6,415,193 B1 *  7/2002  Betawar ........... G05B 19/41865
                                                          700/121
9,418,106 B1 *  8/2016  Ayyagari ............ G06F 16/2457
(Continued)

FOREIGN PATENT DOCUMENTS

KR     20100065071 A     6/2010
KR     20160082732 A     7/2016
(Continued)

OTHER PUBLICATIONS

International Search Report dated Oct. 8, 2018, issued in International Application No. PCT/KR2018/007147.

*Primary Examiner* — Adam Lee
(74) *Attorney, Agent, or Firm* — Jefferson IP Law, LLP

(57) ABSTRACT

A method for rendering a SVG content is provided. The method includes identifying one or more SVG tags and attributes in the SVG content by parsing the SVG content. Further, the method includes converting each of the identified SVG tags and attributes to a unique binary stream for obtaining a binary representation of the SVG content. The unique binary stream represents each of the SVG tags and the attributes. Further, the method includes storing the binary representation of the SVG content. Further, the method includes dynamically rendering the SVG content by parsing the binary representation.

20 Claims, 22 Drawing Sheets

(51) Int. Cl.
*G06F 8/52* (2018.01)
*G06F 8/41* (2018.01)
*G06F 16/84* (2019.01)
*G06F 9/455* (2018.01)
*G06F 40/106* (2020.01)
*G06F 40/205* (2020.01)

(52) U.S. Cl.
CPC ............ *G06F 16/84* (2019.01); *G06F 40/106* (2020.01); *G06F 40/205* (2020.01)

(56) References Cited

U.S. PATENT DOCUMENTS

| | | | | |
|---|---|---|---|---|
| 2001/0047394 | A1* | 11/2001 | Kloba | H04W 4/00 709/217 |
| 2003/0046317 | A1 | 3/2003 | Cseri et al. | |
| 2003/0128390 | A1* | 7/2003 | Yip | H04N 1/00204 358/1.18 |
| 2004/0111672 | A1* | 6/2004 | Bowman | G06F 9/451 715/234 |
| 2004/0177357 | A1* | 9/2004 | Heller | G05B 19/0423 718/100 |
| 2004/0215665 | A1* | 10/2004 | Edgar | H04L 63/08 |
| 2006/0112167 | A1 | 5/2006 | Steele et al. | |
| 2006/0242187 | A1* | 10/2006 | Scharf | G06F 16/258 |
| 2007/0050830 | A1* | 3/2007 | Uchida | H04N 1/00291 725/105 |
| 2007/0057956 | A1* | 3/2007 | Gimpl | G06F 16/248 345/553 |
| 2008/0127153 | A1* | 5/2008 | Liu | G06F 9/4486 717/162 |
| 2008/0201695 | A1* | 8/2008 | Zhou | G06F 8/51 717/136 |
| 2008/0215672 | A1* | 9/2008 | Kloba | H04W 4/00 709/203 |
| 2008/0266205 | A1* | 10/2008 | Moehring | G06F 1/1613 345/1.2 |
| 2008/0300850 | A1 | 12/2008 | Chen et al. | |
| 2009/0083298 | A1 | 3/2009 | Ishizaki | |
| 2009/0128690 | A1* | 5/2009 | Burnett | G06F 16/84 348/426.1 |
| 2010/0083101 | A1* | 4/2010 | Denoual | G06F 17/2247 715/242 |
| 2011/0191407 | A1* | 8/2011 | Fu | G06F 8/38 709/203 |
| 2012/0036360 | A1* | 2/2012 | Bassu | H04L 9/3228 713/168 |
| 2012/0072828 | A1* | 3/2012 | Barkman | G06T 1/00 715/234 |
| 2012/0249870 | A1* | 10/2012 | Senster | G06F 16/957 348/441 |
| 2012/0272137 | A1 | 10/2012 | Medi et al. | |
| 2015/0370445 | A1* | 12/2015 | Wang | G06F 16/986 715/765 |
| 2015/0370538 | A1* | 12/2015 | Wang | G06F 8/34 717/105 |
| 2015/0370763 | A1* | 12/2015 | Wang | G06F 17/212 715/235 |
| 2017/0139574 | A1* | 5/2017 | Dong | G06F 3/04845 |

FOREIGN PATENT DOCUMENTS

WO 02/076058 A2 9/2002
WO 2008100887 A1 8/2008

* cited by examiner

METHOD AND ELECTRONIC DEVICE FOR RENDERING SCALABLE VECTOR GRAPHICS CONTENT

CROSS-REFERENCE TO RELATED APPLICATION(S)

This application is based on and claims priority under 35 U.S.C. § 119(a) of an Indian Provisional patent application number 201741023119 filed on Jun. 30, 2017, in the Indian Intellectual Property Office, and of an Indian Complete Specification patent application number 201741023119, filed on Feb. 9, 2018, in the Indian Intellectual Property Office, the disclosure of which is incorporated by reference herein in its entirety.

BACKGROUND

1. Field

The disclosure relates to a content processing system. More particularly, the disclosure relates to a method and electronic device for rendering a scalable vector graphics (SVG) content.

2. Description of Related Art

A scalable vector graphics (SVG) image is a digital image defined by a series of strings. The series of strings comprise instructions that are used to place lines or shapes in a two-dimensional space or a three-dimensional space. The SVG image, created by a developer using a graphics editor, can be saved as a file called a SVG file or a SVG resource. The SVG file is saved in an extensible markup language (XML) format which includes a set of instructions in the form of text. The SVG image is widely used in an application (e.g., web browser application, gaming applications, mobile application or the like). During an execution of the SVG file in the application, an XML language serves as an interpreter language to parse the SVG file. The parsing of the SVG file includes processing each string literally for collecting a data regarding the SVG image from the SVG file. However, the execution of the SVG file puts a load on a processor as because many driving functions in the strings are processed by the processor for displaying the SVG image.

Further, the execution of the SVG file becomes more complex at times when a lot of vector paths in multiple levels and associated attributes (such as masks, gradients, filters, animations, or the like) are presented in the strings, which requires more processing time for string comparisons to display the SVG image. The SVG file occupies more memory, in a range of hundreds of Kbs, leading to heavy load in an executable file in the application. For example, a mobile application may contain multiple SVG files as resources, which leads to a huge size in a package file and requires more processing time to display the SVG image. Therefore, a performance of the electronic device is hugely affected when multiple SVG files need to be executed simultaneously.

Thus, it is desired to address the above mentioned disadvantages or other shortcomings or at least provide a useful alternative.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for rendering a scalable vector graphics (SVG) content. The method includes identifying one or more SVG tags and attributes in the SVG content by parsing the SVG content. Further, the method includes converting each of the identified SVG tags and attributes to a unique binary stream for obtaining a binary representation of the SVG content. The unique binary stream represents each of the SVG tags and the attributes. Further, the method includes storing the binary representation of the SVG content. Further, the method includes dynamically rendering the SVG content by parsing the binary representation.

Additional aspects will be set forth in part in the description which follows and, in part, will be apparent from the description, or may be learned by practice of the presented embodiments.

In an embodiment, converting each of the identified SVG tags and attributes to the unique binary stream for obtaining the binary representation of the SVG content includes identifying dependencies among one or more SVG tags and attributes in the SVG content, reordering one or more reference elements in the SVG content and converting each of the identified SVG tags and attributes to the unique binary stream based on the identified dependencies and the reordering of the one or more reference elements.

In an embodiment, the unique binary stream representing each of the SVG tags and the attributes is customizable.

In an embodiment, one or more SVG resources in an application are converted to the binary representation by parsing the one or more SVG resources in an executable file of the application.

In an embodiment, the one or more SVG resources are dynamically extracted and converted to the binary representation.

In accordance with an aspect of the disclosure, an electronic device for rendering a SVG content is provided. The electronic device includes a SVG file controller coupled to a memory and at least one processor. The SVG file controller is configured to identify one or more SVG tags and attributes in the SVG content by parsing the SVG content. The SVG file controller is configured to convert each of the identified SVG tags and attributes to a unique binary stream for obtaining binary representation of the SVG content. The unique binary stream represents each of the SVG tag along with the attributes. Further, the SVG file controller is configured to store the binary representation of the SVG content. Further, the SVG file controller is configured to dynamically render the SVG content by parsing the binary representation.

According to an aspect of the present disclosure, an electronic device is provided. The electronic device includes at least one memory storing instructions, SVG content, and a mapping table, and at least one processor operatively coupled with the memory. The mapping table associates each of a plurality of SVG tags with a corresponding binary stream and each of a plurality of SVG attributes with a corresponding binary stream. The at least one processor is configured to execute the stored instruction to identify one or more SVG tags and attributes in the SVG content by parsing the SVG content, obtain a binary representation of the SVG content by converting each of the identified SVG tags and attributes to the corresponding binary stream by using the mapping table, and store the binary representation of the SVG content in the memory.

In accordance with an aspect of the disclosure, an electronic device is provided. The electronic device includes a display, a memory storing instructions and a mapping table, and one of more processor operatively coupled with the memory and the display. The mapping table associates each of a plurality of SVG tags with a corresponding binary stream and each of a plurality of SVG attributes with a corresponding binary stream. The at least one processor is configured to execute the stored instructions to identify whether a SVG content is in the binary representation, upon determining that the SVG content is in a binary representation, obtain vector data of the SVG content by parsing the binary representation of the SVG content, by using the mapping table, and control the display to display the SVG content by rendering the vector data.

In accordance with an aspect of the disclosure, a method for generating binary representation of SVG content is provided. The method includes identifying one or more SVG tags and attributes in the SVG content by parsing the SVG content, obtaining a binary representation of the SVG content by converting each of the SVG tags and attributes to the corresponding binary stream by using the mapping table, wherein the mapping table associates each of the SVG tags with a corresponding binary stream and each of the SVG attributes with a corresponding binary stream, and storing the binary representation of the SVG content.

In accordance with an aspect of the disclosure, a method for rendering SVG content is provided. The method includes identifying whether the SVG content is in a binary representation, upon determining that the SVG content is in a binary representation, obtaining vector data of the SVG content by parsing the binary representation of the SVG content, by using the mapping table, wherein the mapping table associates each of a plurality of SVG tags with a corresponding binary stream and each of a plurality of SVG attributes with a corresponding binary stream, and displaying the SVG content by rendering the vector data.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Other aspects, advantages, and salient features of the disclosure will become apparent to those skilled in the art from the following detailed description, which, taken in conjunction with the annexed drawings, discloses various embodiments of the disclosure

BRIEF DESCRIPTION OF FIGURES

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
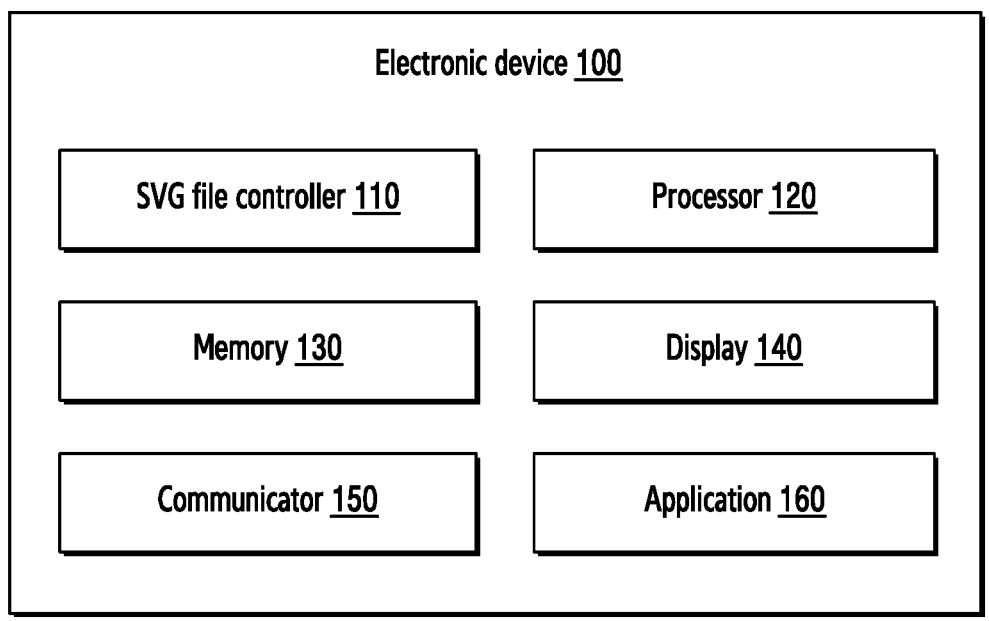
FIG. 1 is a block diagram of an electronic device, according to an embodiment of the disclosure.

The following description with reference to the accompanying drawings is provided to assist in comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Embodiments may be described and illustrated in terms of blocks which carry out a described function or functions. These blocks, which may be referred to herein as managers, units, modules, hardware components or the like, are physically implemented by analogue and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

In accordance with an aspect of the disclosure, a method for rendering a scalable vector graphics (SVG) content is provided. The method includes identifying one or more SVG tags and attributes in the SVG content by parsing the SVG content, converting each of the identified SVG tags and attributes to a unique binary stream for obtaining a binary representation of the SVG content, storing the binary representation of the SVG content, and dynamically rendering the SVG content by parsing the binary representation. The unique binary stream represents each of the SVG tags and the attributes.

The proposed method can be used to reduce processing overhead on the processor while rendering the SVG content on the processor by converting the SVG content to its binary representation. Comparatively, parsing of the binary representation of the SVG content consumes very less amount of time than parsing the SVG content in a text form, so that the processor can execute multiple SVG content within a less span of time which improves overall processing speed of an electronic device for displaying the SVG content. With the reduction of the processing overhead, complex animations can be easily implemented even in a low performance device (e.g., smart phone, or the like).

A size of a binary scalable vector graphics (BSVG) resource is smaller than the size of a SVG resource or a portable network graphics (PNG) resource. The smaller size of the BSVG resource reduces the size of an application significantly. Thus the proposed method can be used to improve the time required for parsing SVG files and reducing the size of the SVG files, where the SVG files are widely used for two-dimensional graphics by graphics designers across all platforms & applications like mobile or web based. The application may execute faster even though from an online source (e.g., web server) due to the less load on the processor. The reduction in the size of SVG file also helps in a faster transmission of the SVG file over a network.

In the proposed method, performance of parsing is improved by 50-60% with the use of binary SVG files over use of text SVG files.

In the existing methods according to the related art, every application maintains different resolution resource files (e.g., PNG file) to handle device resolution change. This increases the final package size. In the proposed methods, a single Binary SVG may be used instead of the PNG files to handle different resolution and also it will reduce package size.

The proposed method may be used to convert the SVG resources in the application to the BSVG resources. With the proposed method, the electronic device unpacks the SVG resources in the application and converts SVG tags and attributes in the SVG resource to a corresponding binary representation. The binary representation of the SVG tags and the attributes are defined in the BSVG resource. This results in reducing the size of SVG file and assisting a faster transmission of the SVG file over a network.

FIG. 1 is a block diagram of an electronic device, according to an embodiment of the disclosure.

Referring to FIG. 1, the electronic device 100 may be, for example, a smart phone, a tablet computer, a mobile device, a personal digital assistance (PDA), a multimedia device, a personal computer (PC), a laptop computer, a digital video player, a camera, a game console or any other similar functioning device, a wearable device, or the like. The electronic device 100 may include a SVG file controller 110, a processor 120, a memory 130, a display 140, a communicator 150, and an application 160.

The SVG file controller 110 receives a SVG file. SVG content is available in the SVG file with one or more SVG tags and attributes in the form of text. The SVG content may be an SVG image, an animated SVG image, a text SVG file, or the like. The attributes may be SVG elements, SVG attributes, SVG constants, SVG units, SVG custom attributes, etc. Various examples of the SVG elements, the SVG attributes, the SVG constants, and the SVG units and corresponding binary values are shown in Table 1.

TABLE 1

Attributes and corresponding binary values

| Attributes | Standard SVG Value | Changed Binary Value |
|---|---|---|
| SVG elements | SVG | 0x0000 0000 |
| | CLIPPATH | 0x0000 0001 |
| | MASK | 0x0000 0002 |
| | FILTER | 0x0000 0003 |
| | LINE | 0x0000 0004 |
| | POLYLINE | 0x0000 0005 |
| | POLYGON | 0x0000 0006 |
| | CIRCLE | 0x0000 0007 |
| | ELLIPSE | 0x0000 0008 |
| | RECT | 0x0000 0009 |
| | TEXT | 0x0000 000A |
| | TSPAN | 0x0000 000B |
| | TREF | 0x0000 000C |
| | FONT | 0x0000 000D |
| | G | 0x0000 000E |
| | DEFS | 0x0000 000F |
| | SYMBOL | 0x0000 0010 |
| | USE | 0x0000 0011 |
| | SWITCH | 0x0000 0012 |
| | MARKER | 0x0000 0013 |
| | LINEARGRADIENT | 0x0000 0014 |
| | RADIALGRADIENT | 0x0000 0015 |
| | SOLIDCOLOR | 0x0000 0016 |
| | SOLIDOPACITY | 0x0000 0017 |
| | PATH | 0x0000 0018 |
| | MPATH | 0x0000 0019 |
| | STOP | 0x0000 001A |
| | SET | 0x0000 001B |
| | ANIMATE | 0x0000 001C |
| | ANIMATECOLOR | 0x0000 001D |
| | ANIMATEMOTION | 0x0000 001E |
| | ANIMATETRANSFORM | 0x0000 001F |
| | FEGAUSSIANBLUR | 0x0000 0020 |
| | FEOFFSET | 0x0000 0021 |
| | FECOLORMATRIX | 0x0000 0022 |
| | FEBLEND | 0x0000 0023 |
| | TEXTPATH | 0x0000 0025 |
| SVG Attributes | VIEWBOX | 0x1000 0000 |
| | ID | 0x1000 0001 |
| | VISIBILITY | 0x1000 0002 |
| | DISPLAY | 0x1000 0003 |
| | OPACITY | 0x1000 0004 |
| | BACKGROUND | 0x1000 0005 |
| | COLOR | 0x1000 0006 |
| | FILL | 0x1000 0007 |
| | FILL-RULE | 0x1000 0008 |
| | FILL-OPACITY | 0x1000 0009 |
| | STROKE | 0x1000 000A |
| | STROKE-OPACITY | 0x1000 000B |
| | STROKE-WIDTH | 0x1000 000C |
| | STROKE-LINECAP | 0x1000 000D |
| | STROKE-LINEJOIN | 0x1000 000E |
| | STROKE-DASHARRAY | 0x1000 000F |
| | STROKE-DASHOFFSET | 0x1000 0010 |
| | STROKE-MITERLIMIT | 0x1000 0011 |
| | FONT-FAMILY | 0x1000 0012 |
| | FONT-SIZE | 0x1000 0013 |
| | FONT-WEIGHT | 0x1000 0014 |
| | FONT-STYLE | 0x1000 0015 |
| | TEXT-ANCHOR | 0x1000 0016 |
| | CLIP-RULE | 0x1000 0017 |
| | MASK | 0x1000 0018 |
| | X | 0x1000 0019 |
| | Y | 0x1000 001A |
| | WIDTH | 0x1000 001B |
| | HEIGHT | 0x1000 001C |
| | X1 | 0x1000 001D |
| | Y1 | 0x1000 001E |
| | X2 | 0x1000 001F |
| | Y2 | 0x1000 0020 |
| | CX | 0x1000 0021 |
| | CY | 0x1000 0022 |
| | R | 0x1000 0023 |
| | RX | 0x1000 0024 |
| | RY | 0x1000 0025 |
| | FX | 0x1000 0026 |
| | FY | 0x1000 0027 |
| | TRANSFORM | 0x1000 0028 |
| | D | 0x1000 0029 |
| | POINTS | 0x1000 002A |
| | STOP-COLOR | 0x1000 002B |
| | STOP-OPACITY | 0x1000 002C |
| | SOLID-COLOR | 0x1000 002D |
| | SOLIDOPACITY | 0x1000 002E |
| | OFFSET | 0x1000 002F |
| | GRADIENTUNITS | 0x1000 0030 |
| | GRADIENTTRANSFORM | 0x1000 0031 |
| | SPREADMETHOD | 0x1000 0032 |
| | CLIPPATHUNITS | 0x1000 0033 |
| | CLIP-PATH | 0x1000 0034 |
| | MASKUNITS | 0x1000 0035 |
| | MASKCONTENTUNITS | 0x1000 0036 |
| | HREF | 0x1000 0037 |
| | CALCMODE | 0x1000 0038 |
| | KEYTIMES | 0x1000 0039 |
| | KEYSPLINES | 0x1000 003A |
| | BEGIN | 0x1000 003B |
| | DUR | 0x1000 003C |
| | END | 0x1000 003D |
| | MIN | 0x1000 003E |
| | MAX | 0x1000 003F |
| | RESTART | 0x1000 0040 |
| | REPEATCOUNT | 0x1000 0041 |
| | REPEATDUR | 0x1000 0042 |
| | ADDITIVE | 0x1000 0043 |
| | ACCUMULATE | 0x1000 0044 |
| | FILTERUNITS | 0x1000 0045 |
| | DX | 0x1000 0046 |
| | DY | 0x1000 0047 |
| | RESULT | 0x1000 0048 |
| | IN | 0x1000 0049 |
| | MODE | 0x1000 004A |
| | STDDEVIATION | 0x1000 004B |
| | FILTER | 0x1000 004C |
| | STYLE | 0x1000 004D |
| | ATTRIBUTETYPE | 0x1000 004E |
| | MIX-BLEND-MODE | 0x1000 004F |
| | ATTRIBUTENAME | 0x1000 0050 |
| | TYPE | 0x1000 0051 |
| | FROM | 0x1000 0052 |
| | TO | 0x1000 0053 |
| | BY | 0x1000 0054 |
| | VALUES | 0x1000 0055 |
| | PATH | 0x1000 0056 |
| | ROTATE | 0x1000 0057 |
| | ENABLE-BACKGROUND | 0x1000 005B |
| | OVERFLOW | 0x1000 005C |
| | STARTOFFSET | 0x1000 005D |
| SVG constants | INHERIT | 0x2000 0000 |
| | NONE | 0x2000 0001 |
| | HREF | 0x2000 0002 |
| | CURR_CURRENTCOLOR | 0x2000 0003 |
| | SUM | 0x2000 0004 |
| | REPLCE | 0x2000 0005 |
| | FREEZE | 0x2000 0006 |
| | REMOVE | 0x2000 0007 |
| | DISCRETE | 0x2000 0008 |
| | LINER | 0x2000 0009 |
| | PACED | 0x2000 000A |
| | SPLINE | 0x2000 000B |
| | INLINE | 0x2000 000C |
| | BLOCK | 0x2000 000D |
| | LIST_LISTITEM | 0x2000 000E |
| | RUN_RUNIN | 0x2000 000F |
| | COMPACT | 0x2000 0010 |
| | MARKER | 0x2000 0011 |
| | TABLE | 0x2000 0012 |
| | INLINE_INLINETABLE | 0x2000 0013 |
| | TABLE_ROW_TABLEROWGROUP | 0x2000 0014 |
| | TABLE_HEADER_ | 0x2000 0015 |

TABLE 1-continued

Attributes and corresponding binary values

| Attributes | Standard SVG Value | Changed Binary Value |
|---|---|---|
| | TABLEHEADERGROUP | |
| | TABLE_FOOTER_TABLEFOOTERGROUP | 0x2000 0016 |
| | TABLE_TABLEROW | 0x2000 0017 |
| | TABLE_TABLECOLUMN | 0x2000 0018 |
| | TABLE_COLUMN_TABLECOLUMNGROUP | 0x2000 0019 |
| | TABLE_TABLECELL | 0x2000 001A |
| | TABLE_TABLECAPTION | 0x2000 001B |
| | BUTT | 0x2000 001C |
| | SQUARE | 0x2000 001D |
| | MITER | 0x2000 001E |
| | ROUND | 0x2000 001F |
| | BEVEL | 0x2000 0020 |
| | INDEFINITE | 0x2000 0021 |
| | ALWAYS | 0x2000 0022 |
| | MEDIA | 0x2000 0023 |
| | WHENNOTACTIVE | 0x2000 0024 |
| | NEVER | 0x2000 0025 |
| | AUTO | 0x2000 0026 |
| | AUTO_AUTOREVERSE | 0x2000 0027 |
| | PAD | 0x2000 0028 |
| | REFLECT | 0x2000 0029 |
| | REPEAT | 0x2000 002A |
| | START | 0x2000 002B |
| | MIDDLE | 0x2000 002C |
| | END | 0x2000 002D |
| | TRANSLATE | 0x2000 002E |
| | SCALE | 0x2000 002F |
| | ROTATE | 0x2000 0030 |
| | SKEWX | 0x2000 0031 |
| | SKEWY | 0x2000 0032 |
| | MATRIX | 0x2000 0033 |
| | SATURATE | 0x2000 0034 |
| | HUEROTATE | 0x2000 0035 |
| | LUMINANCETOALPHA | 0x2000 0036 |
| | USERSPACE_ON_USERSPACEONUSE | 0x2000 0037 |
| | OBJECT_OBJECTBOUNDINGBOX | 0x2000 0038 |
| | NORMAL | 0x2000 0039 |
| | BOLD | 0x2000 003A |
| | BOLDER | 0x2000 003B |
| | LIGHTER | 0x2000 003C |
| | ITALIC | 0x2000 003D |
| | OBLIQUE | 0x2000 003E |
| | SCREEN | 0x2000 003F |
| | LIGHTEN | 0x2000 0040 |
| | DARKEN | 0x2000 0041 |
| | MULTIPLY | 0x2000 0042 |
| | ADD | 0x2000 0043 |
| | SUBTRACT | 0x2000 0044 |
| | DIFFERENCE | 0x2000 0045 |
| | INTERSECT | 0x2000 0046 |
| | CSS | 0x2000 0047 |
| | XML | 0x2000 0048 |
| | XOR | 0x2000 0049 |
| | UNION | 0x2000 004A |
| | INTERSECTION | 0x2000 004B |
| | MERGE | 0x2000 004C |
| | EVENODD | 0x2000 004D |
| | NONZERO | 0x2000 004E |
| | SCROLL | 0x2000 004F |
| | INITIAL | 0x2000 0050 |
| | HIDDEN | 0x2000 0051 |
| | VISIBLE | 0x2000 0052 |
| SVG units | NONE | 0x4000 0000 |
| | PX | 0x4000 0001 |
| | % (PERCENT) | 0x4000 0002 |
| | S (SECONDS) | 0x4000 0003 |
| | MS (MILLISECONDS) | 0x4000 0004 |
| | EM | 0x4000 0005 |
| | EX | 0x4000 0006 |
| | IN | 0x4000 0007 |
| | CM | 0x4000 0008 |
| | MM | 0x4000 0009 |
| | PT | 0x4000 000A |
| | PC | 0x4000 000B |

Examples for the SVG custom attributes and corresponding binary values are shown in Table 2.

TABLE 2

Custom SVG attributes and corresponding binary values

| SVG custom attributes | Converted Binary Value | Description |
|---|---|---|
| OP (operation) | 0x1000 0058 | This attribute is used for merging multiple paths within a group. Visual effects tool has a support for this kind of operation where a resultant path is a combination of various path element according to the operation that is specified on it. The operations that are currently supported on paths are "Add", "intersect", "subtract", "exclude intersection" and "merge". |
| IS_CLIP_PATH | 0x1000 0059 | This attribute is used to specify a mask that should be used as a clip path. Rendering the information as a clip gives much better performance in an animation as applying the mask involves a bitmap creation for every frame during the rendering. The value for this attribute is a Boolean value. |
| MASK-MODE | 0x1000 005A | This attribute is used to specify the operation on the multiple paths within a mask element. The mask element sometimes consists of the multiple paths which requires a particular pattern to be followed for a desired effect. The operations that are currently supported on paths are "add", "subtract" and "intersect" |
| KEYFRAME | — | This attribute is used for frame by frame animation. If this attribute can be added as an attribute for the group element, then all the nested group inside the main group is treated as an individual frame. The rendering can happen in such a way that the group is visible for only a specific time and then it disappears. Hence, a result similar to frame by frame animation can be obtained. |
| KEYFRAMEDUR | — | This attribute is also for the group element which can be used to set a duration for an entire animation. The duration for each frame is also calculated using this by dividing the value by a total number of nested groups or the frame. |

TABLE 2-continued

Custom SVG attributes and corresponding binary values

| SVG custom attributes | Converted Binary Value | Description |
|---|---|---|
| KEYFRAME-DELAY | — | This attribute is also for the group element which can be used to give a delay that is required in the animation. |

An example of the SVG file comprising various strings to define the SVG content is shown in Table 3.

TABLE 3

Strings in SVG file

```
<svg version="1.1" id="svg-root" width="100%" height="100%"
viewBox="0 0 480 360" xmlns="http://www.w3.org/2000/svg">
  <g transform="translate(180,220)">
    <path id="b" fill="#ff0000" stroke="rgb(255,180,0)" stroke-
    width="10" d="M88.479,29.296c6.319,0.308,11.708-
    4.543,12.011-10.838c0.315-6.295-4.567-11.648-10.903-
    11.951c-6.334-0.311-11.715,4.55-
    12.027,10.845C77.26,23.642,82.138,28.999,88.479,29.296z"/>
    <animateTransform attributeName="transform" type="rotate"
    values="0;360;180;360" dur="3s"/>
  </g>
</svg>
```
MAJOR_VERSION: 1
MINOR_VERSION: 0
topLevelElements.size: 1
Element.name: ELEMENT_SVG
Element.attrCount: 4
Attribute.name: VIEWBOX
Attribute.dataType: FLOAT_ARRAY
Attribute.floatArray[0]: 0.0
Attribute.floatArray[1]: 0.0
Attribute.floatArray[2]: 480.0
Attribute.floatArray[3]: 360.0
Attribute.units: NONE
Attribute.name: ID
Attribute.dataType: STRING
Attribute.string: svg-root
Attribute.units: NONE
Attribute.name: WIDTH
Attribute.dataType: FLOAT
Attribute.float: 100.0
Attribute.units: PERCENT
Attribute.name: HEIGHT
Attribute.dataType: FLOAT
Attribute.float: 100.0
Attribute.units: PERCENT
Element.childCount: 1
Element.name: ELEMENT_G
Element.attrCount: 1
Attribute.name: TRANSFORM
Attribute.dataType: MATRIX
Attribute.matrix: 1.0, 0.0, 180.0 , 0.0, 1.0 , 220.0, 0.0, 0.0, 1.0
Attribute.units: NONE
Element.childCount: 2
Element.name: ELEMENT_PATH
Element.attrCount: 5
Attribute.name: ID
Attribute.dataType: STRING
Attribute.string: b
Attribute.units: NONE
Attribute.name: FILL
Attribute.dataType: COLOR
Attribute.color: −65536
Attribute.units: NONE
Attribute.name: STROKE
Attribute.dataType: COLOR
Attribute.color: −19456
Attribute.units: NONE
Attribute.name: STROKE_WIDTH
Attribute.dataType: FLOAT
Attribute.float: 10.0

TABLE 3-continued

Strings in SVG file

Attribute.units: NONE
Attribute.name: D
Attribute.dataType: PATH
Attribute.PATH
M: 88.479004, 29.296001
c: 6.3190002, 0.308, 11.708, −4.5429997, 12.011001 ,−10.838
c: 0.315 , −6.295 , −4.567, −11.648001 , −10.903 , −11.951
c: −6.3340006, −0.311, −11.715 ,4.55 , −12.027, 10.845
C: 77.259995 , 23.642002, 82.138 , 28.999, 88.479004, 29.296001
Attribute.units: NONE
Element.childCount: 0
Element.name: ELEMENT_ANIMATE_TRANSFORM
Element.attrCount: 4
Attribute.name: DUR
Attribute.dataType: TIME
Attribute.time: 3000
Attribute.units: NONE
Attribute.name: ATTRIBUTENAME
Attribute.dataType: STRING
Attribute.string: transform
Attribute.units: NONE
Attribute.name: TYPE
Attribute.dataType: SPECIAL_CONSTANT
Attribute.constant: ROTATE
Attribute.units: NONE
Attribute.name: VALUES
Attribute.dataType: FLOAT_ARRAY
Attribute.floatArray[0]: 0.0
Attribute.floatArray[1]: 0.0
Attribute.floatArray[2]: 0.0
Attribute.floatArray[3]: 360.0
Attribute.floatArray[4]: 0.0
Attribute.floatArray[5]: 0.0
Attribute.floatArray[6]: 180.0
Attribute.floatArray[7]: 0.0
Attribute.floatArray[8]: 0.0
Attribute.floatArray[9]: 360.0
Attribute.floatArray[10]: 0.0
Attribute.floatArray[11]: 0.0
Attribute.units: NONE
Element.childCount: 0

Examples of strings to define the attributes of the SVG content in the SVG file are shown in Table 4.

TABLE 4

Attributes and strings

| Attributes | Strings |
|---|---|
| svg | Element.name: ELEMENT_SVG<br>Element.attrCount: 4<br>Element.childCount: 1 |
| viewBox = "0 0 480 360" | Attribute.name: VIEWBOX<br>Attribute.dataType: FLOAT_ARRAY<br>Attribute.floatArray[0]: 0.0<br>Attribute.floatArray[1]: 0.0<br>Attribute.floatArray[2]: 480.0<br>Attribute floatArray[3]: 360.0<br>Attribute.units: NONE |
| " id = "svg-root" | Attribute.name: ID<br>Attribute.dataType: STRING<br>Attribute.string: svg-root<br>Attribute.units: NONE |
| width = "100%" | Attribute.name: WIDTH<br>Attribute.dataType: FLOAT<br>Attribute.float: 100.0<br>Attribute.units: PERCENT |
| height = "100%" | Attribute.name: HEIGHT<br>Attribute.dataType: FLOAT<br>Attribute.float: 100.0<br>Attribute.units: PERCENT |
| g | Element.name: ELEMENT_G<br>Element.attrCount: 1<br>Element.childCount: 2 |

TABLE 4-continued

Attributes and strings

| Attributes | Strings |
|---|---|
| transform = "translate(180, 220)" | Attribute.name: TRANSFORM<br>Attribute.dataType: MATRIX<br>Attribute.matrix: 1.0, 0.0, 180.0, 0.0, 1.0, 220.0, 0.0, 0.0, 1.0<br>Attribute.units: NONE |
| path | Element.name: ELEMENT_PATH<br>Element.attrCount: 5<br>Element.childCount: 0 |
| id = "b" | Attribute.name: ID<br>Attribute.dataType: STRING<br>Attribute.string: b<br>Attribute.units: NONE |
| fill = "#ff0000" | Attribute.name: FILL<br>Attribute.dataType: COLOR<br>Attribute.color: −65536<br>Attribute.units: NONE |
| stroke = "rgb(255, 180, 0)" | Attribute.name: STROKE<br>Attribute.dataType: COLOR<br>Attribute.color: −19456<br>Attribute.units: NONE |
| stroke-width = "10" | Attribute.name: STROKE_WIDTH<br>Attribute.dataType: FLOAT<br>Attribute.float: 10.0<br>Attribute.units: NONE |
| d = "M88.479, 29.296c6.3 19, 0.308, 11.708-4.543, 12.011-10.838c0.315-6.295-4.567-11.648-10.903-11.951c-6.334-0.311-11.715, 4.55-12.027, 10.845C77.26, 23.642, 82.138, 28.999, 88.4 79, 29.296z" | Attribute.name: D<br>Attribute.dataType: PATH<br>Attribute.PATH<br>M: 88.479004, 29.296001<br>c: 6.3190002, 0.308, 11.708, −4.5429997, 12.011001, −10.838<br>c: 0.315, −6.295, −4.567, −11.648001, −10.903, −11.951<br>c: −6.3340006, −0.311, −11.715, 4.55, −12.027, 10.845<br>C: 77.259995, 23.642002, 82.138, 28.999, 88.479004 29.296001<br>Attribute.units: NONE |
| animateTransform | Element.name: ELEMENT_ANIMATE_TRANSFORM<br>Element.attrCount: 4<br>Element.childCount: 0 |
| dur = "3s" | Attribute.name: DUR<br>Attribute.dataType: TIME<br>Attribute.time: 3000<br>Attribute.units: NONE |
| attributeName = "transform" | Attribute.name: ATTRIBUTENAME<br>Attribute.dataType: STRING<br>Attribute.string: transform<br>Attribute.units: NONE |
| type = "rotate" | Attribute.name: TYPE<br>Attribute.dataType: SPECIAL_CONSTANT<br>Attribute.constant: ROTATE<br>Attribute.units: NONE |
| values = "0; 360; 180; 360 | Attribute.name: VALUES<br>Attribute.dataType: FLOAT_ARRAY<br>Attribute.floatArray[0]: 0.0<br>Attribute.floatArray[1]: 0.0<br>Attribute.floatArray[2]: 0.0<br>Attribute.floatArray[3]: 360.0<br>Attribute.floatArray[4]: 0.0<br>Attribute.floatArray[S]: 0.0<br>Attribute.floatArray[6]: 180.0<br>Attribute.floatArray[7]: 0.0<br>Attribute.floatArray[8]: 0.0<br>Attribute.floatArray[9]: 360.0<br>Attribute.floatArray[10]: 0.0<br>Attribute.floatArray[11]: 0.0<br>Attribute.units: NONE |

The SVG file controller 110 is configured to identify the validity of the SVG file by validating the file format of the SVG file with a standard file format. The SVG file controller 110 parses the SVG content in the SVG file to extract the SVG tags and the attributes in the SVG content upon qualifying the validity check by the SVG file. The SVG file controller 110 identifies the SVG tags and the attributes of the SVG content from the SVG file using the extracted SVG tags and attributes in the SVG content.

The SVG file controller 110 identifies dependencies among the SVG tags and the attributes from the extracted SVG tags and attributes in the SVG content using a schema tree. The schema tree defines a relationship among the SVG tags and the attributes. The SVG file controller 110 maps the SVG tags and the attributes to its corresponding binary representation or binary values using hash tables. The hash tables contain the mapping information of each SVG tag and the attribute in the text form to its corresponding binary representation.

The SVG file controller 110 maps the custom SVG tags to its corresponding binary representation using the custom tag format and the hash tables. The SVG file controller 110 reorders one or more reference elements in the SVG content using reordering rules to resolve the dependencies among the SVG tags and the attributes. The reference elements in the SVG content provide identity information of the SVG tags and the attributes in the SVG file.

The SVG file controller 110 generates data packets containing the extracted SVG tags and the attributes based on data packet structures. The SVG file controller 110 generates the binary representation of the SVG tags and the attributes by converting the data packets to a unique binary stream based on the mapping information. Further, the SVG file controller 110 generates the BSVG file, where the binary representation of the SVG tags and the attributes are defined in the BSVG file.

The SVG file controller 110 parses the binary representation of the SVG tags and the attributes in the BSVG file to obtain a vector data of the SVG content in the binary representation using the hash tables and the data packet structure. The SVG file controller 110 renders the vector data of the SVG content in the binary representation for displaying the SVG content in the display 140.

The SVG file controller 110 transfers the BSVG file to the memory 140. The SVG file controller 110 may be configured to receive the BSVG file from the memory 140.

The binary representation may be referred to as either a standard binary representation or a custom binary representation.

The processor 120 is configured to execute instructions stored in the memory 130. The memory 140 stores information regarding the schema tree, the hash tables, the data packet structures, the custom tag format, the reordering rules, etc. The memory 140 may store the SVG files and the BSVG files. Examples of such non-volatile storage elements may include magnetic hard discs, optical discs, floppy discs, flash memories, or forms of electrically programmable memories (EPROM) or electrically erasable and programmable (EEPROM) memories.

In addition, the memory 130 is a non-transitory storage medium. The term "non-transitory" indicates that the storage medium is not embodied in a carrier wave or a propagated signal. However, the term "non-transitory" should not be interpreted that the memory 130 is non-movable. In some examples, the memory 130 may be configured to store larger amounts of information than the memory 130. In certain examples, a non-transitory storage medium may store data that can, over time, change (e.g., in Random Access Memory (RAM) or cache).

The display 140 receives a rendered vector data of the SVG content in the binary representation from the SVG file controller 110 to display the SVG content. The communicator 150 is configured to communicate the electronic device 100 with other devices (not shown) via a wired or a wireless connection. The communicator 150 is configured for the communication of the components within the electronic device 100.

The application 160 includes the resources to execute during application execution. The resources (not shown) includes image resources such as PNG files, JPG files, SVG files, BSVG files, etc. The application may be a web browser, a gaming application, an image viewer or the like.

Although FIG. 1 shows the hardware components of the electronic device 100 but it is to be understood that other embodiments are not limited therein. In other embodiments, the electronic device 100 may include less or more number of components. Further, the labels or names of the components are used only for illustrative purpose and does not limit the scope of the invention. One or more components can be combined together to perform same or substantially similar function to render the SVG content.

Figure 2:
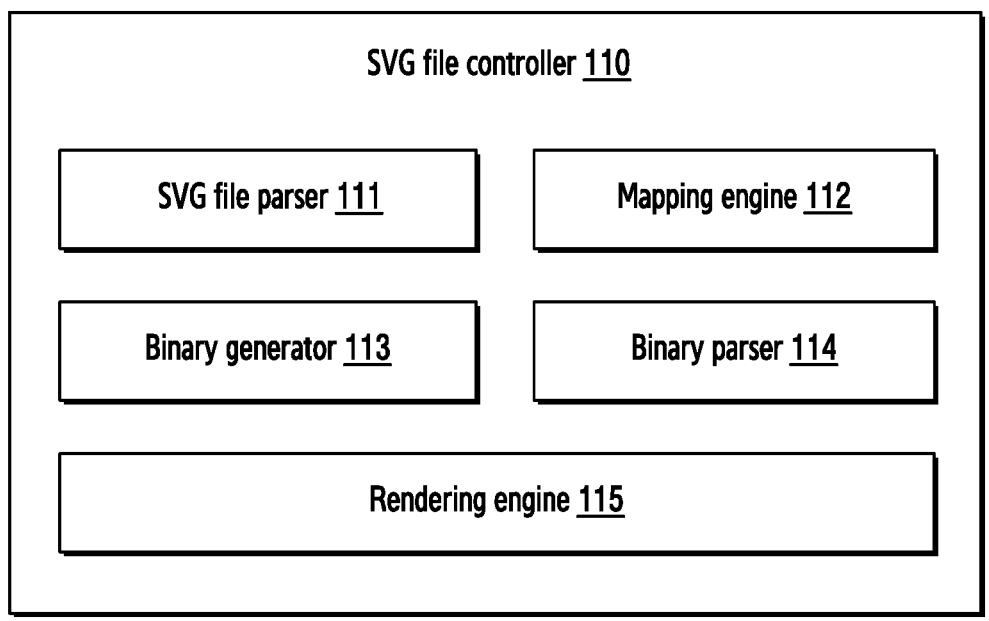
FIG. 2 is a block diagram of a scalable vector graphics (SVG) file controller, according to an embodiment of the disclosure.

FIG. 2 is a block diagram of an SVG file controller, according to an embodiment of the disclosure.

Referring to FIG. 2, the SVG file controller 110 includes a SVG file parser 111, a mapping engine 112, a binary generator 113, a binary parser 114 and a rendering engine 115.

The SVG file parser 111 receives the SVG file and checks the validity of the SVG file by validating the file format of the SVG file with the standard file format. The SVG file parser 111 parses the SVG content in the SVG file to collect the extracted SVG tags and attributes in the SVG content up on qualifying the validity check by the SVG file. The SVG file parser 111 identifies the SVG tags and the attributes of the SVG content from the SVG file using the extracted SVG tags and attributes in the SVG content. The SVG file parser 111 transfers the extracted SVG tags and attributes in the SVG content to the mapping engine 112.

The mapping engine 112 identifies the dependencies among the SVG tags and the attributes from the extracted SVG tags and attributes in the SVG content using the schema tree. The mapping engine 112 maps the SVG tags and the attributes to its corresponding binary representation or binary values using the hash tables. The mapping engine 112 maps the custom SVG tag to its corresponding binary representation using the custom tag format and the hash tables. The mapping engine 112 reorders one or more reference elements in the SVG content using the reordering rules to resolve the dependencies among the SVG tags and the attributes. The mapping engine 112 generates data packets contain the extracted SVG tags and attributes based on the data packet structures. The mapping engine 112 transfers the data packets to the binary generator 113.

The binary generator 113 generates the binary representation of the SVG tags and the attributes by converting the data packets to a unique binary stream based on the mapping information. The binary generator 113 generates the BSVG file, where the binary representation of the SVG tags and the attributes are defined in the BSVG file. The binary generator 113 transfers the BSVG file to the binary parser 114. The binary generator 113 may transfer the BSVG file to the memory 130.

The binary parser 114 parses the binary representation of the SVG tags and the attributes in the BSVG file to obtain the vector data of the SVG content in the binary representation. The mapping engine 112 maps the binary representation of SVG tags and the attributes in the BSVG file to its corresponding vector data in the binary representation using the hash tables and the data packet structure. The mapping engine 112 provides the vector data in the binary representation to the binary parser 114. The binary parser 114 transfers the vector data of the SVG content in the binary representation to the rendering engine 115.

The rendering engine 115 renders the vector data of the SVG content in the binary representation for displaying the SVG content in the display 140.

Although FIG. 2 shows the hardware components of the SVG file controller 110, it is to be understood that other embodiments are not limited thereto. In other embodiments, the SVG file controller 110 may include less or more number of components. Further, the labels or names of the components are used only for illustrative purpose and does not limit the scope of the invention. One or more components can be combined together to perform same or substantially similar function to render the SVG content.

Figure 3:
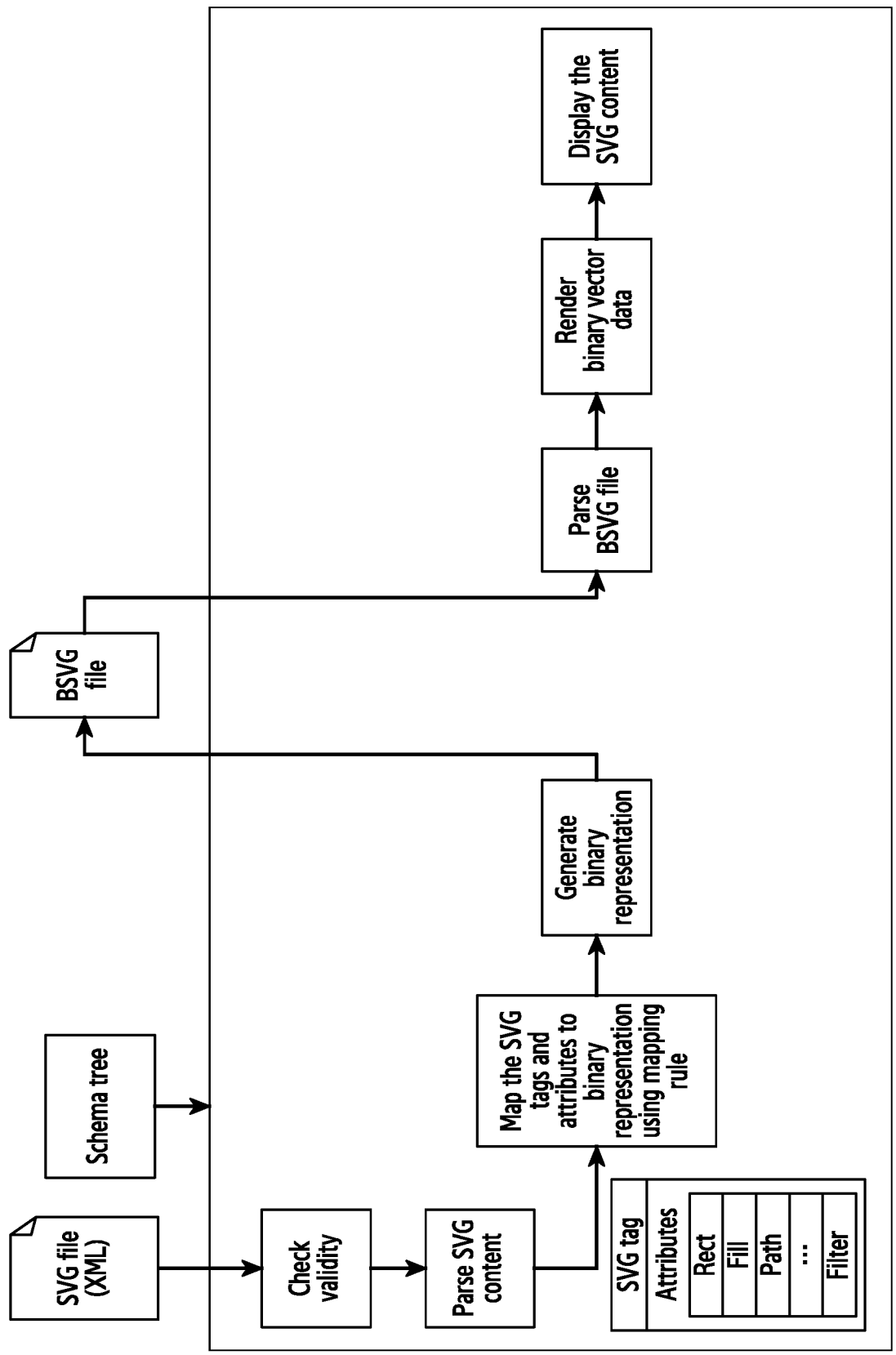
FIG. 3 is an architectural diagram illustrating various operations for rendering SVG content, according to an embodiment of the disclosure.

FIG. 3 is an architectural diagram illustrating various operations for rendering SVG content, according to an embodiment of the disclosure.

Referring to FIG. 3, the SVG file parser 111 receives the SVG file and checks the validity of the SVG file by validating the file format of the SVG file with the standard file format. The SVG file parser 111 aborts remaining operations on the SVG file and gives an exception to the SVG file in the rendering of the SVG file, if the validity check of the SVG file fails. The SVG file parser 111 parses the SVG content in the SVG file to collect the extracted SVG tags and attributes in the SVG content up on qualifying the validity check by the SVG file. The SVG file parser 111 identifies the SVG tags and the attributes of the SVG content from the SVG file using the extracted SVG tags and attributes in the SVG content. The SVG file parser 111 transfers the extracted SVG tags and attributes in the SVG content to the mapping engine 112. The mapping engine 112 identifies the dependencies among the SVG tags and the attributes from the extracted SVG tags and attributes in the SVG content using the schema tree. The mapping engine 112 maps the SVG tags and the attributes to its corresponding binary representation or binary values using the hash tables. The hash table defines a one-to-one mapping between the SVG tags and the attributes in the SVG file and their binary values. The mapping engine 112 maps the custom SVG tag to a corresponding binary representation using the custom tag format and the hash tables. The mapping engine 112 reorders one or more reference elements in the SVG content using the reordering rules to resolve the dependencies among the SVG tags and the attributes. The mapping engine 112 generates data packets containing the extracted SVG tags and attributes based on the data packet structures. The mapping engine 112 transfers the data packets to the binary generator 113.

The binary generator 113 generates the binary representation of the SVG tags and the attributes by converting the data packets to a unique binary stream based on the mapping information. The binary generator 113 generates the BSVG file, where the binary representation of the SVG tags and the attributes are defined in the BSVG file. The binary generator 113 transfers the BSVG file to the binary parser 114. The binary generator 113 may transfer the BSVG file to the memory 130.

The binary parser 114 parses the binary representation of the SVG tags and the attributes in the BSVG file to obtain the vector data of the SVG content in the binary representation. The mapping engine 112 maps the binary representation of SVG tags and the attributes in the BSVG file to a corresponding vector data in the binary representation using the hash tables and the data packet structure. The mapping engine 112 provides the vector data in the binary representation to the binary parser 114. The binary parser 114 transfers the vector data of the SVG content in the binary representation to the rendering engine 115.

The rendering engine 115 renders the vector data of the SVG content in the binary representation for displaying the SVG content in the display 140.

Figure 4:
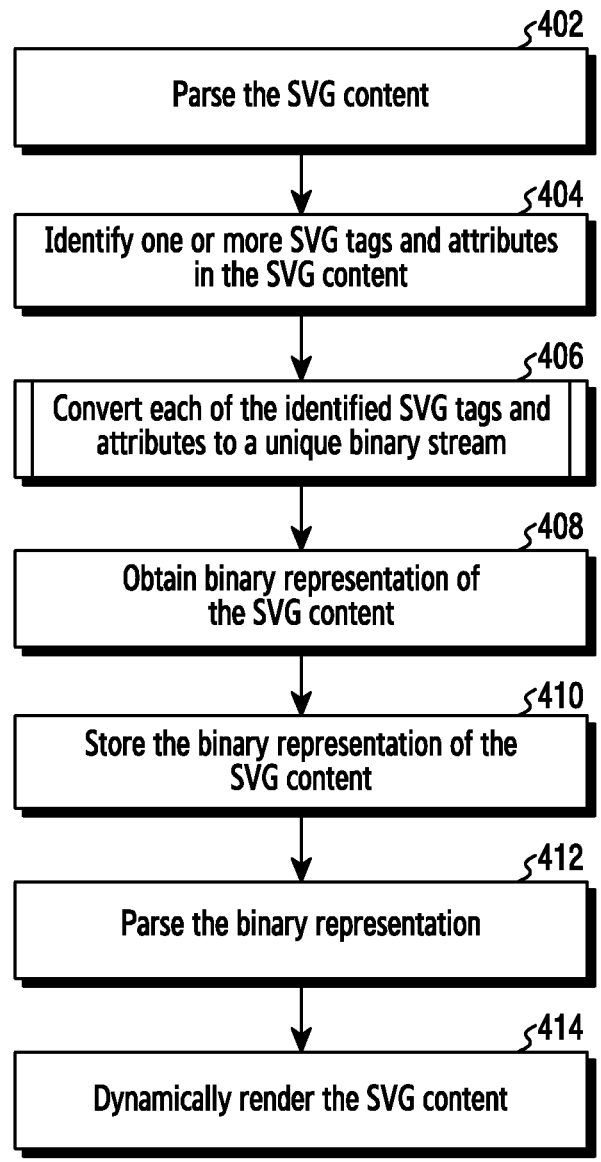
FIG. 4 is a flow diagram illustrating a method for rendering of SVG content, according to an embodiment of the disclosure.

FIG. 4 is a flow diagram illustrating a method for rendering of SVG content, according to an embodiment of the disclosure.

Referring to FIG. 4, at operation 402, the method includes parsing the SVG content. The method allows the SVG file parser 111 to parse the SVG content. At operation 404, one or more SVG tags and attributes in the SVG content are identified. The SVG file parser 111 may identify one or more SVG tags and attributes in the SVG content. At operation 406, each of the identified SVG tags and attributes are converted to the unique binary. The binary generator 113 converts each of the identified SVG tags and attributes to the unique binary stream. At operation 408, the method includes obtaining the binary representation of the SVG content. The method allows the binary generator 113 obtains the binary representation of the SVG content. At operation 410, the method includes storing the binary representation of the SVG content. The method allows the memory 130 stores the binary representation of the SVG content. At operation 412, the method includes parsing the binary representation. The method allows the binary parser 114 parses the binary representation. At operation 414, the method includes dynamically rendering the SVG content. The method allows the rendering engine 115 dynamically renders the SVG content.

The various actions, acts, blocks, steps, or the like in the flow diagram illustrated in FIG. 4 may be performed in the order presented, in a different order or simultaneously. Further, in some embodiments, some of the actions, acts, blocks, steps, or the like may be omitted, added, modified, skipped, or the like without departing from the scope of the invention.

Figure 5:
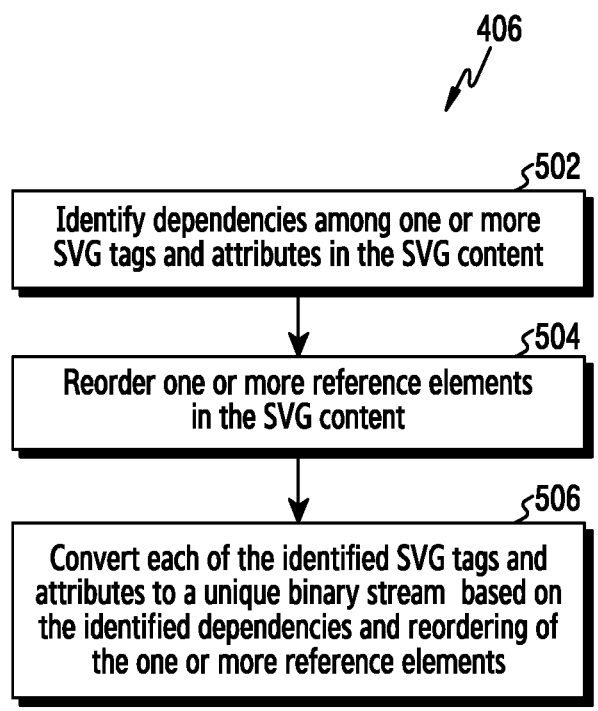
FIG. 5 is a flow diagram illustrating various operations for converting SVG tags and attributes in SVG content to a unique binary stream, while rendering the SVG content, according to an embodiment of the disclosure.

FIG. 5 is a flow diagram illustrating a method for converting SVG tags and attributes in SVG content to a unique binary stream, while rendering the SVG content, according to an embodiment of the disclosure.

Referring to FIG. 5, the procedure of converting the SVG tags and the attributes in the SVG content to the unique binary stream may correspond to the detailed operation of operation 406 of FIG. 4.

At operation 502, the method includes identifying the dependencies among one or more SVG tags and attributes in the SVG content. The method allows the mapping engine 112 identifies the dependencies among one or more SVG tags and attributes in the SVG content. At operation 504, the method includes reordering one or more reference elements in the SVG content. The method allows the mapping engine 112 reorders one or more reference elements in the SVG content. At operation 506, the method includes converting each of the identified SVG tags and attributes to the unique binary stream based on the identified dependencies and the reordering of the one or more reference elements. The method allows the mapping engine 112 converts each of the identified SVG tags and attributes to the unique binary stream based on the identified dependencies and the reordering of the one or more reference elements.

The various actions, acts, blocks, steps, or the like illustrated in FIG. 5 may be performed in the order presented, in a different order or simultaneously. Further, in some embodiments, some of the actions, acts, blocks, steps, or the like may be omitted, added, modified, skipped, or the like without departing from the scope of the invention.

Figure 6:
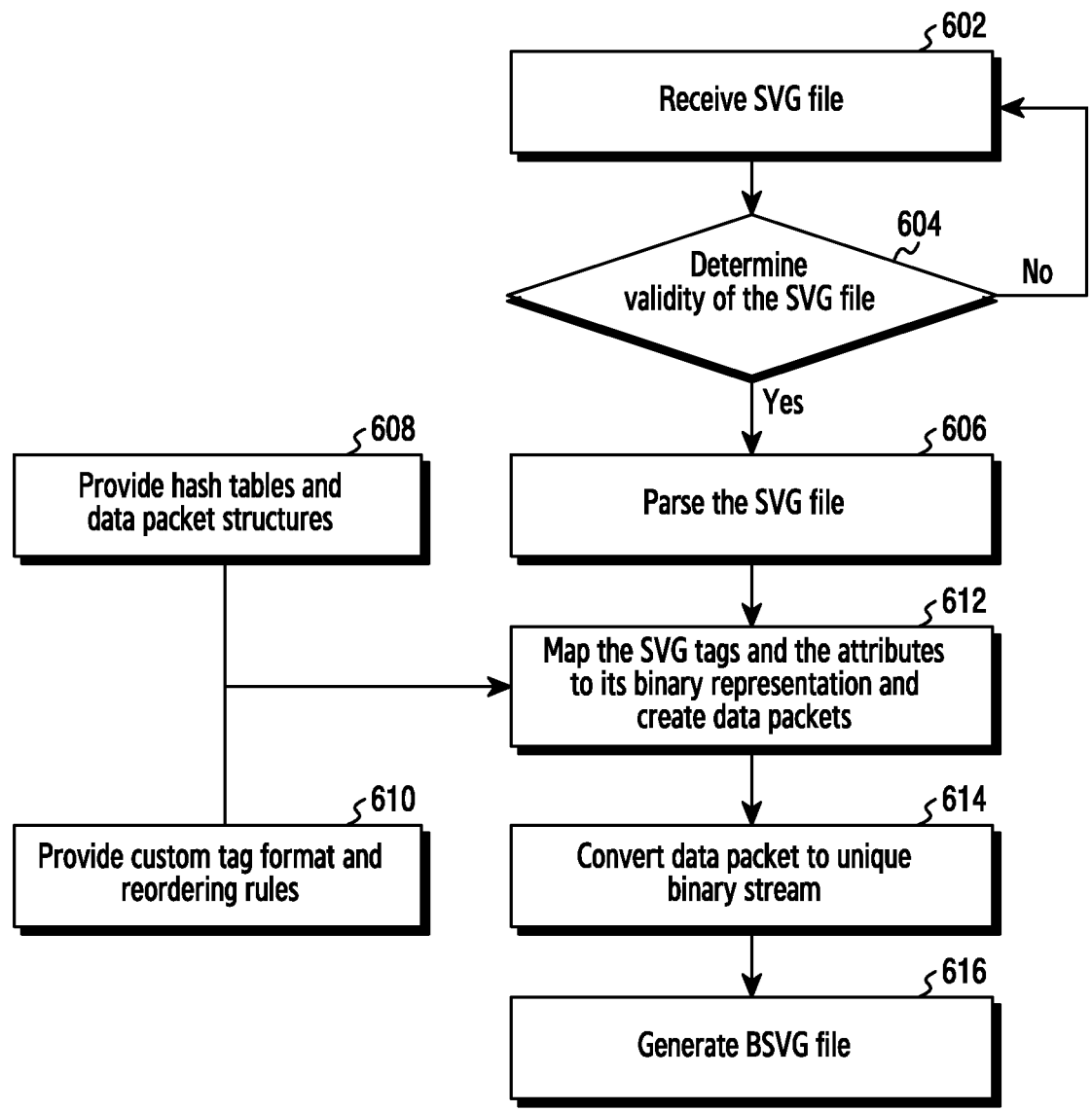
FIG. 6 is a flow diagram illustrating various operations for generating a binary scalable vector graphics (BSVG) file in an offline mode, while rendering SVG content, according to an embodiment of the disclosure.

FIG. 6 is a flow diagram illustrating a method for generating a B SVG file in an offline mode, while rendering SVG content, according to an embodiment of the disclosure.

At operation 602, the SVG file parser 111 receives the SVG file. At operation 604, the method includes determining the validity of the SVG file. The method allows the SVG file parser 111 determines the validity of the SVG file. At operation 606, the method includes parsing the SVG file upon qualifying the validity check by the SVG file. The method allows the SVG file parser 111 parses the SVG file upon qualifying the validity check by the SVG file. At operation 608, the method includes providing the hash tables and the data packet structures for mapping the SVG tags and the attributes. The method allows the memory 130 provides the hash tables and the data packet structures for mapping the SVG tags and the attributes. At operation 610, the method includes providing the custom tag format and the reordering rules for mapping the SVG tags and the attributes. The method allows the memory 130 provides the custom tag format and the reordering rules for mapping the SVG tags and the attributes. At operation 612, the method includes mapping the SVG tags and the attributes to its binary representation and creating data packets. The method allows the mapping engine 112 maps the SVG tags and the attributes to its binary representation and create the data packets. At operation 614, the method includes converting the data packet to the unique binary stream. The method allows the binary generator 113 converts the data packet to the unique binary stream. At operation 616, the method includes generating the BSVG file in the offline mode. The method allows the binary generator 113 generates the BSVG file in the offline mode.

The various actions, acts, blocks, steps, or the like illustrated in FIG. 6 may be performed in the order presented, in a different order or simultaneously. Further, in some embodiments, some of the actions, acts, blocks, steps, or the like may be omitted, added, modified, skipped, or the like without departing from the scope of the invention.

Figure 7:
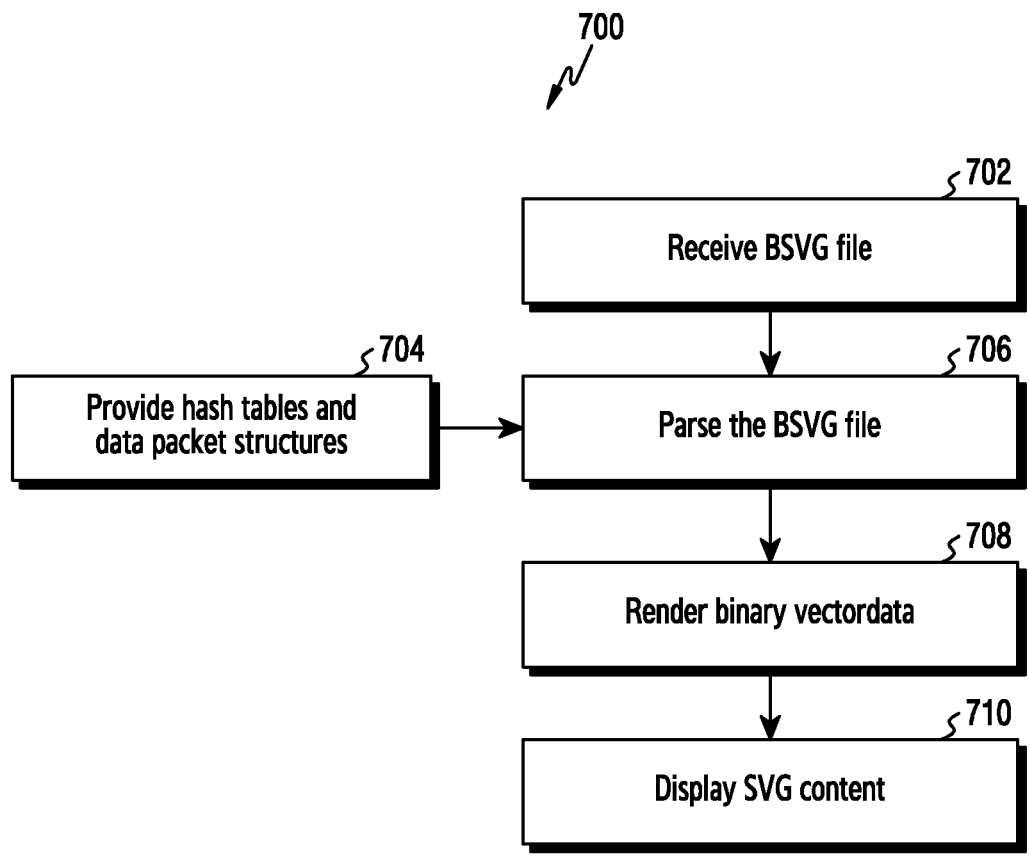
FIG. 7 is a flow diagram illustrating various operations for rendering a vector data of SVG content in a binary representation in an online mode, according to an embodiment of the disclosure.

FIG. 7 is a flow diagram illustrating a method for rendering vector data of SVG content in a binary representation in an online mode, according to an embodiment of the disclosure.

Referring to FIG. 7, at operation 702, the method includes receiving the BSVG file in the online mode. The method allows the binary parser 114 receives the BSVG file in the online mode. At operation 704, the method includes providing the hash tables and the data packet structures for parsing the BSVG file. The method allows the memory 130 provides the hash tables and the data packet structures for parsing the BSVG file. At operation 706, the method includes parsing the BSVG file to generate the vector data of the SVG content in the binary representation. The method allows the binary parser 114 parses the BSVG file to generate the vector data of the SVG content in the binary representation. At operation 708, the method includes rendering a binary vector data. The binary vector data is the vector data of the SVG content in a binary representation. The method allows the rendering engine 115 renders the binary vector data. At operation 710, the method includes displaying the SVG content. The method allows the display 140 displays the SVG content.

The various actions, acts, blocks, steps, or the like illustrated in FIG. 7 may be performed in the order presented, in a different order or simultaneously. Further, in some embodiments, some of the actions, acts, blocks, steps, or the like may be omitted, added, modified, skipped, or the like without departing from the scope of the invention.

Figure 8:
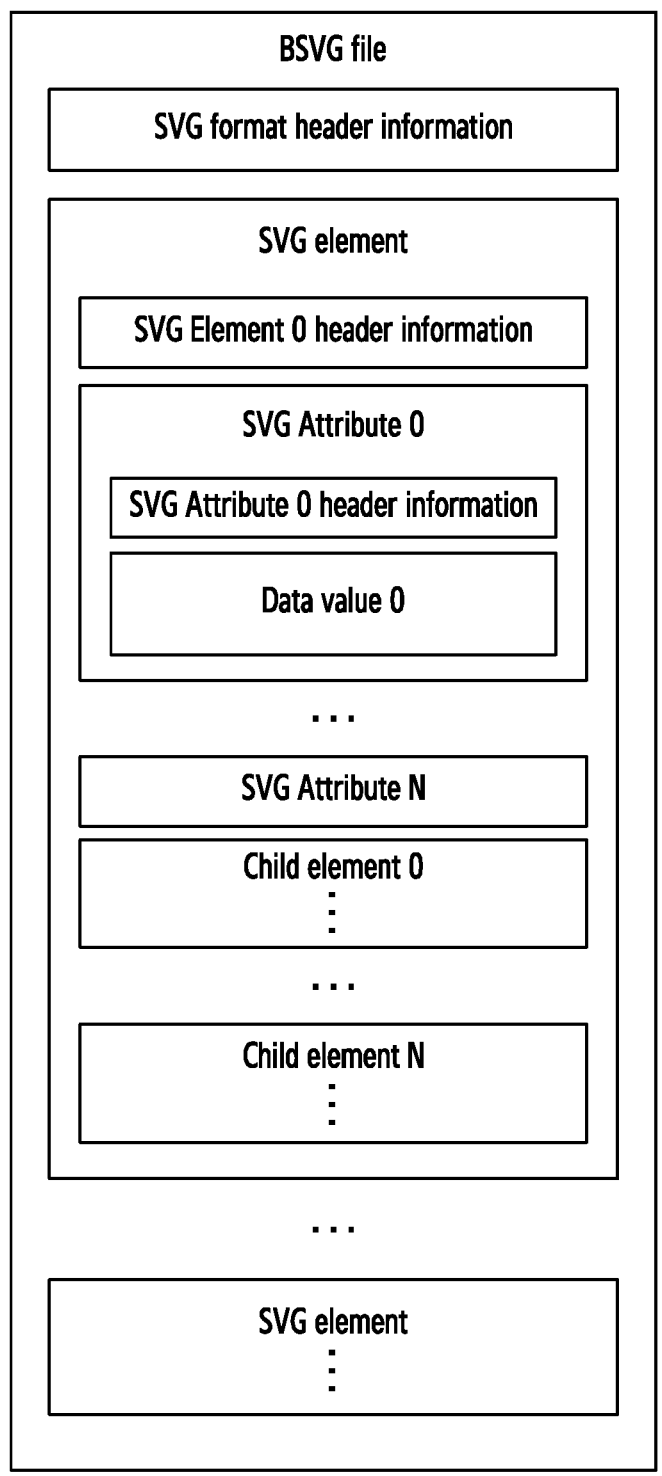
FIG. 8 illustrates a file content structure of a BSVG file, according to an embodiment of the disclosure.

FIG. 8 illustrates a file content structure of the BSVG file, according to an embodiment of the disclosure.

Referring to FIG. 8, the file content structure of the BSVG file includes the SVG format header information packet and SVG element packets. The SVG format header information packet provides information regarding a major version and a minor version of the SVG element, number of the SVG elements in the BSVG file, and the sequence of each SVG element to be followed etc. The SVG element packet provides information of the SVG element.

Each SVG element packet includes a header information packet for the SVG element, SVG attribute packets, and child element packets. The header information packet for the SVG element provides information regarding a name of the SVG element, number of the SVG attributes in the SVG element, number of the child elements in the SVG element etc. Each SVG attribute packet provides the information regarding each SVG attribute of the SVG element. The child element packet provides information regarding the number of other SVG elements that are children of one SVG element. Further, the child element packet provides information regarding the other SVG elements which tags one SVG element as a parent.

Each SVG attribute packet includes a header information packet for the SVG attribute and a data value for the SVG attribute. The header information packet for the SVG attribute provides the information regarding a name of the SVG attribute (e.g., fill, opacity, transform, etc.), a data type of the SVG attribute, a unit of the data value etc. The data value represents the value that is associated with the SVG attribute. The number of bytes allocates for the data value is depends on the SVG attribute and the data type.

The BSVG file content structure (e.g., header+contents) includes a binary SVG packet, an element packet and an attribute packet.

A structure of the binary SVG packet is shown in Table 5.

TABLE 5

| Binary SVG packet | | | |
| --- | --- | --- | --- |
| Major version | Minor version | Number of SVG elements | SVG elements |
| int | int | int | SVG element Packet | a) The major version is a version of the SVG element.
b) The minor version is the version of the SVG element.
c) The SVG file may have multiple SVG element tags. The number of SVG elements is the number of SVG tags in the SVG file.
d) The SVG elements represent the SVG elements present sequentially in the SVG file.

The structure of the element packet is shown in Table 6.

TABLE 6

| SVG element packet | | | | |
| --- | --- | --- | --- | --- |
| SVG element name | SVG attribute count | SVG attribute(s) | Child count | Children |
| int | int | SVG attribute packet | int | SVG element packet | a) The SVG element name is a name of the SVG element like "SVG", "G", "RECT", etc.
b) The SVG attribute count represents the number of SVG attributes of the SVG element.
c) The SVG attribute(s) gives the information about each SVG attribute of the SVG element.
d) The child count provides information about the number of the SVG elements that are children of one SVG element.
e) The children provide information regarding other SVG elements that are children of the SVG element. Further, the children provide information regarding the other SVG elements which tags the SVG element as a parent.

The structure of the attribute packet is shown in Table 7.

TABLE 7

| Attribute packet | | | |
| --- | --- | --- | --- |
| SVG attribute name | Data type | SVG attribute value | Unit |
| int | int | Depends on data type | int | a) The SVG attribute name represents the name of the SVG attribute. Example: "fill", "opacity", "transform" etc.
b) The data type represents the data type of the SVG attribute.
c) The SVG attribute value represents the value that is associated with the SVG attribute. The number of bytes that it will take depends on the attribute and its data type.
d) Unit represents the unit of the value of the attribute.

Figure 9:
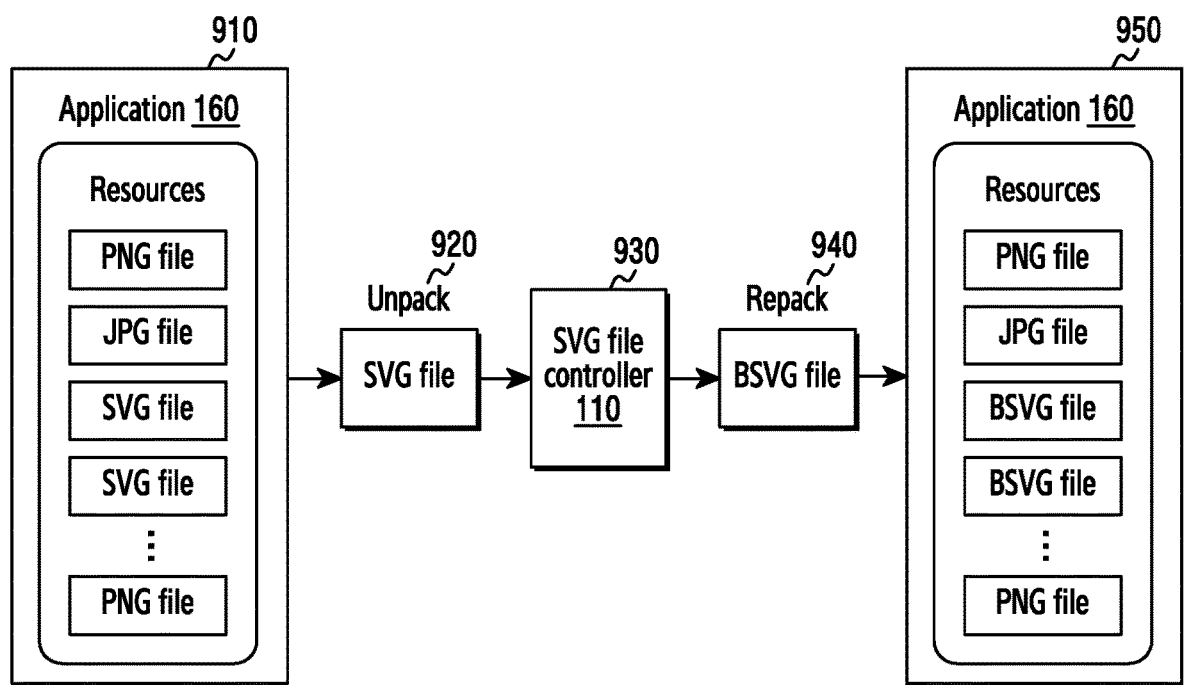
FIG. 9 is a schematic diagram illustrating a conversion of an SVG file to a BSVG resource in an application, according to an embodiment of the disclosure.

FIG. 9 is a schematic diagram illustrating the conversion of the SVG file to the BSVG resource in an application, according to an embodiment of the present disclosure.

Referring to FIG. 9, according to existing methods of the related art, the resources in an existing application have to be newly developed to a different form for rendering the resources in a new rendering platform. Unlike methods of the related art, the proposed method can be used to eliminate the requirement of developing new BSVG resources for rendering the BSVG resources in the existing application, which significantly saves a development time of the existing application.

The application 160 contains resources such as PNG files, JPG files, SVG files (SVG resources) etc. as shown in 910. The SVG file controller unpacks the SVG resources in the application 160 to obtain the SVG tags and the attributes of the SVG content as shown in operation 920. The SVG file controller 110 converts the SVG tags and the attributes to the unique binary stream for obtaining binary representation of the SVG content as shown in operation 930. The binary representation of each SVG content is repacked by the SVG file controller 110 to generate a BSVG file (BSVG resource) as shown in operation 940. The BSVG resources contain the unique binary stream of the SVG tags and the attributes of the SVG content in the SVG resource. The BSVG resource is stored in the resources of the application 160 as shown in 950. Thus, the proposed method can be used to convert the SVG resources in the application 160 to the BSVG resources.

Figure 10:
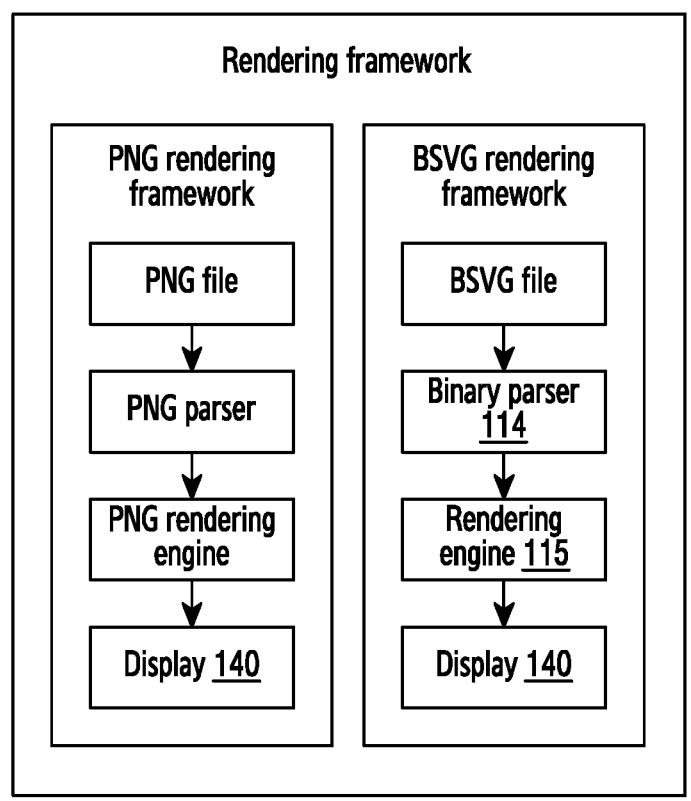
FIG. 10 is a schematic diagram illustrating the rendering of resources in a rendering framework, according to an embodiment of the disclosure.

FIG. 10 is a schematic diagram illustrating rendering of resources in a rendering framework, according to an embodiment of the present disclosure.

Referring to FIG. 10, the rendering framework enables the electronic device 100 to receive the resources and used to display a content (e.g., the SVG content, a PNG image or the like) in the resources. The rendering framework includes individual rendering frameworks, such as a PNG rendering framework, a SVG rendering framework, etc. Each individual rendering framework is used to render its corresponding resources. The PNG rendering framework is used to render the PNG file and the SVG rendering framework is used to render the BSVG file.

The BSVG rendering framework uses the BSVG file, binary parser 114, rendering engine 115 and the display 140 for displaying the SVG content. The binary parser 114 parses the BSVG file to generate the vector data of the SVG content in binary representation and transfers the vector data to the rendering engine 115. The rendering engine 115 renders the vector data to display the SVG content defined in the BSVG file. The rendering engine 115 transfers a rendered vector data to the display 140. The display 140 of the electronic device 100 displays the SVG content based on the rendered vector data obtained from the rendering engine 115.

The PNG rendering framework uses the PNG file, a PNG parser, a PNG rendering engine, and the display 140 for displaying the PNG image. The PNG parser parses the PNG file to obtain a PNG image data and transfers the PNG image data to a PNG rendering engine. The PNG rendering engine renders the PNG image data to display the PNG image. The PNG rendering engine transfers a rendered PNG image data to the display 140. The display 140 of the electronic device 100 displays the PNG image based on the rendered PNG image data obtained from the PNG rendering engine.

Figure 11:
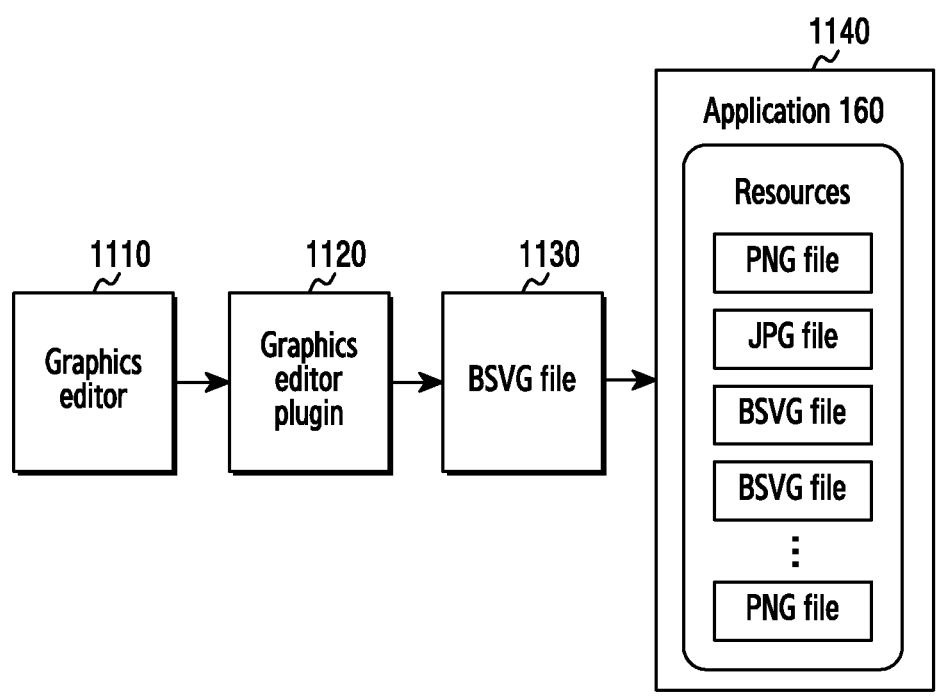
FIG. 11 illustrates a schematic diagram for generating a BSVG resource for an application using a graphics editor plugin, according to an embodiment of the disclosure.

FIG. 11 illustrates a schematic diagram of generating the BSVG resource for an application using a graphics editor plugin, according to an embodiment of the disclosure.

Referring to FIG. 11, the SVG content to be displayed may be sketched and generated using a graphics editor as shown in operation 1110. The graphics editor is integrated with the graphics editor plugin, used to directly generate the binary representation of the SVG content based on the proposed method. At operation 1120, the graphics editor plugin converts the SVG content to its binary representation using the hash tables and the data packet structures. The binary representation of the SVG content is used to obtain the BSVG file or the BSVG resource in operation 1130. The BSVG file is packed to the resources in the application 160 in operation 1140.

Figure 12:
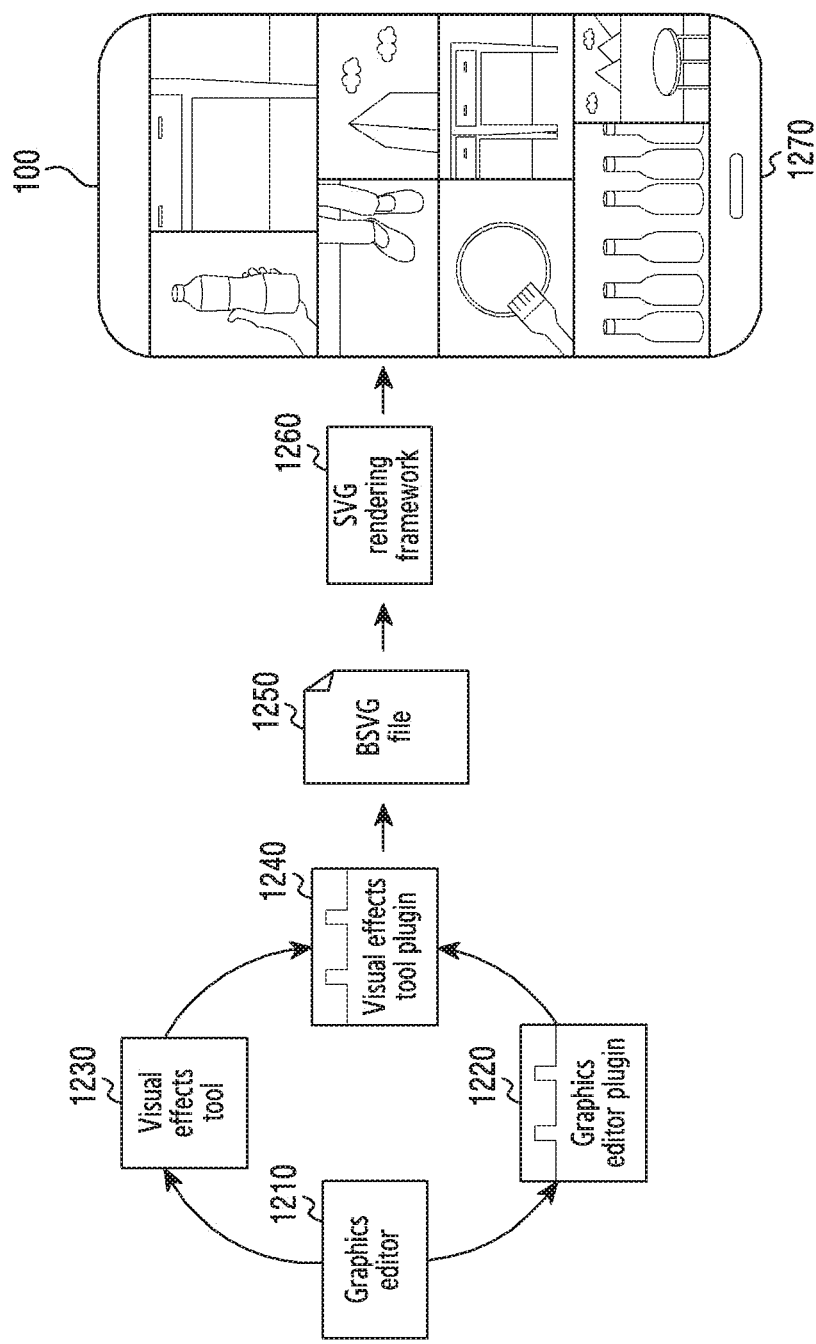
FIG. 12 illustrates an example scenario of generating a BSVG resource and rendering the BSVG resource in an electronic device, according to an embodiment of the disclosure.

FIG. 12 illustrates an example scenario of generating a BSVG resource and rendering the BSVG resource in an electronic device, according to an embodiment of the disclosure.

Referring to FIG. 12, the SVG content to be displayed can be sketched and generated using the graphics editor 1210. The graphics editor is integrated with the graphics editor plugin 1220, used to directly generate the binary representation of the SVG content based on the proposed method. The graphics editor plugin 1220 generates the binary representation of the SVG content, which defines a structure of the SVG content. An additional animation and graphical effects can be given to the SVG content by using a visual effects tool 1230. The visual effects tool 1230 is integrated with a visual effects tool plugin 1240, used to directly generate the binary representation of the additional animation and graphical effects for the SVG content based on the proposed method. The visual effects tool plugin 1240 receives the binary representation of the SVG content. The visual effects tool plugin 1240 generates the binary representation of the SVG content with the additional animation and graphical effects, which defines the structure of the SVG content with the additional animation and graphical effects.

The binary representation of the SVG content with the additional animation and graphical effects are used to generate the BSVG file 1250. The SVG rendering framework 1260 parses and renders the binary representation of the SVG content from the BSVG file 1250, for displaying the SVG content 1270 in the electronic device 100 based on the proposed method.

Comparing the resources obtained based on existing methods and the proposed method in this example scenario, for example, the size of the BSVG assets obtained based on the proposed method is 92 KB, where the BSVG assets contain the information regarding the SVG content in the binary representation. On the other hand, for the same content, the size of the SVG assets obtained based on the existing method of the related art is 124 KB, where the SVG assets contain the information regarding the SVG content in the text form. The size of the PNG assets obtained based on the existing method is 2.05 MB, where the PNG assets contain the information regarding the PNG image.

Figure 13:
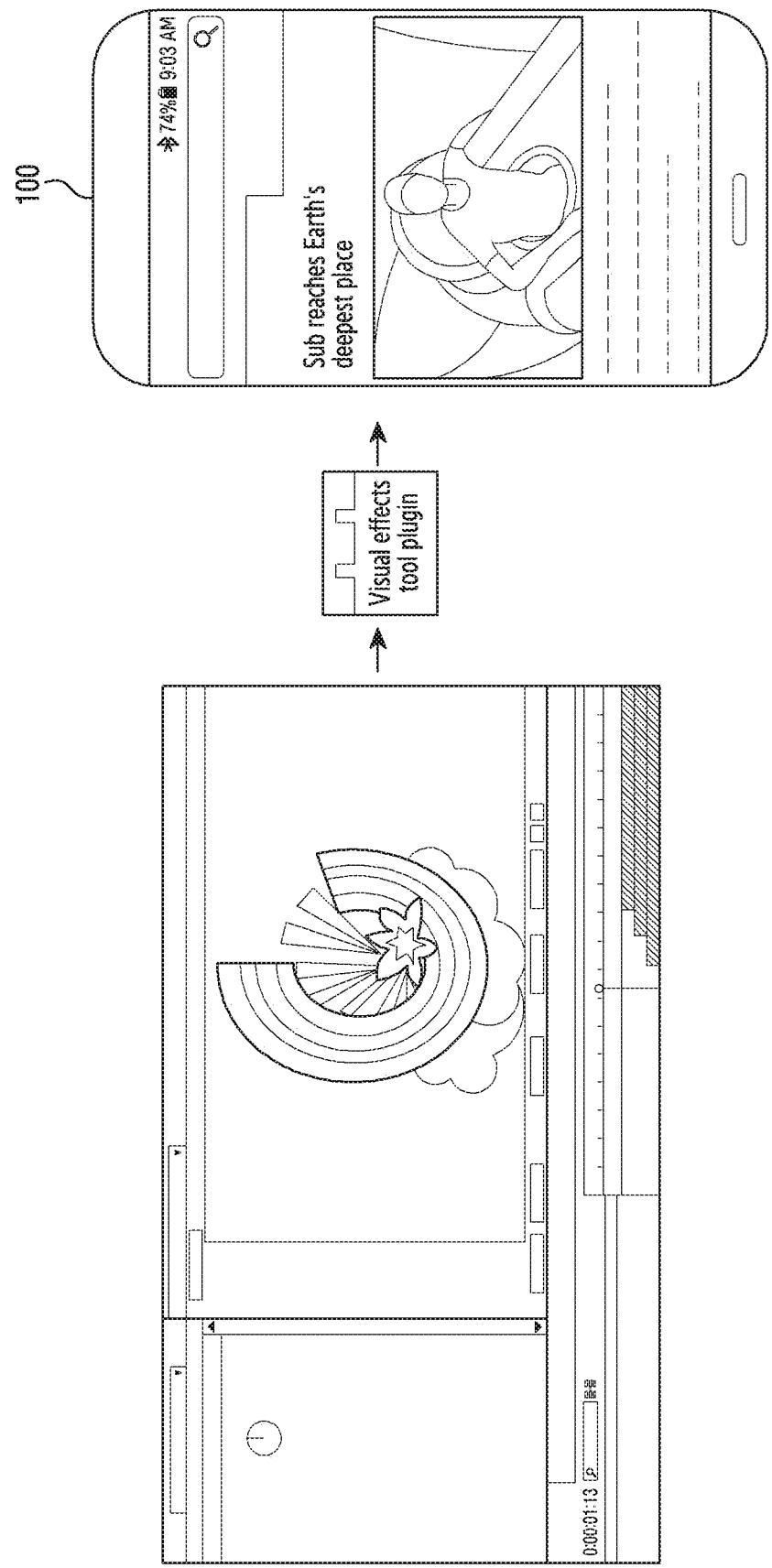
FIG. 13 illustrates an example scenario of dynamically extracting and converting SVG resources to its binary representation using a visual effects tool plugin, according to an embodiment of the disclosure.

FIG. 13 illustrates an example scenario of dynamically extracting and converting SVG resources to a corresponding binary representation using a visual effects tool plugin, according to an embodiment of the disclosure.

Referring to FIG. 13, an animated high definition advertisement may be shown in a website or in an application interface. The visual effects tool plugin enables the visual effects tool to generate the binary representation of the SVG content. The animated high definition advertisement is the SVG content to be shown to a user, which is converted to a corresponding binary representation using the visual effects tool plugin. The size of the binary representation of the SVG content is very small. So the binary representation of the SVG content can be transferred to the electronic device 100 in a faster way to render the animated high definition advertisement. Due to the small size of the binary representation of the SVG content, the processor can perform parsing and rendering the binary representation of the SVG content in a faster way to show the animated high definition advertisement in the website or the application interface without any load.

Figure 14:
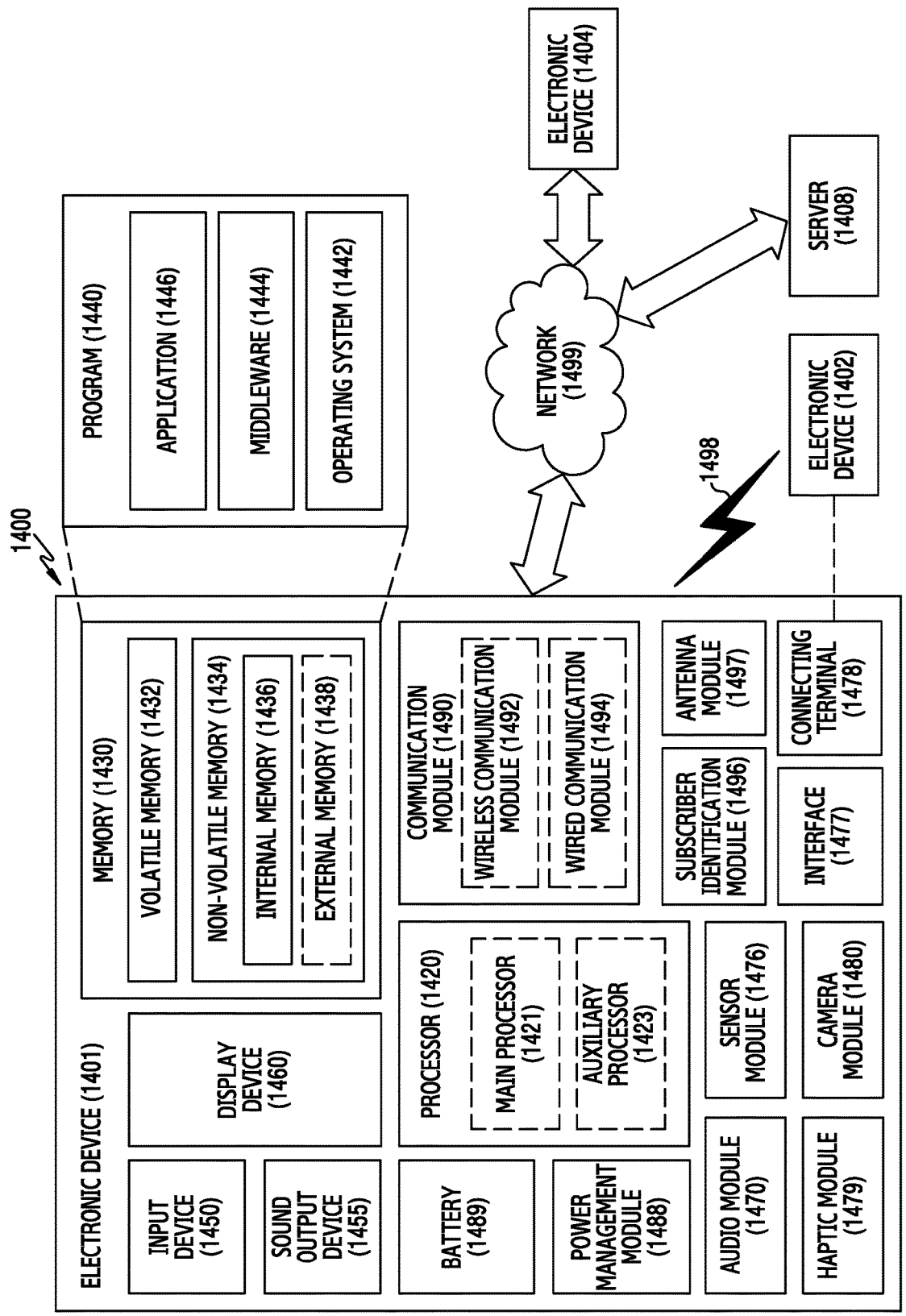
FIG. 14 is a block diagram illustrating an electronic device in a network environment according to various embodiments of the disclosure.

FIG. 14 is a block diagram illustrating an electronic device in a network environment according to an embodiment of the present disclosure.

Referring to FIG. 14, the electronic device 1401 in the network environment 1400 may communicate with an electronic device 1402 via a first network 1498 (e.g., a short-range wireless communication network), or an electronic device 1404 or a server 1408 via a second network 1499 (e.g., a long-range wireless communication network). The electronic device 1401 may communicate with the electronic device 1404 via the server 1408. The electronic device 1401 may include a processor 1420, memory 1430, an input device 1450, a sound output device 1455, a display device 1460, an audio module 1470, a sensor module 1476, an interface 1477, a haptic module 1479, a camera module 1480, a power management module 1488, a battery 1489, a communication module 1490, a subscriber identification module (SIM) 1496, or an antenna module 1497. At least one (e.g., the display device 1460 or the camera module 1480) of the components may be omitted from the electronic device 1401, or one or more other components may be added in the electronic device 1401. Some of the components may be implemented as single integrated circuitry. For example, the sensor module 1476 (e.g., a fingerprint sensor, an iris sensor, or an illuminance sensor) may be implemented as embedded in the display device 1460 (e.g., a display).

The processor 1420 may execute software (e.g., a program 1440) to control at least one other component (e.g., a hardware or software component) of the electronic device 1401 coupled with the processor 1420, and may perform various data processing or computation. As at least part of the data processing or computation, the processor 1420 may load a command or data received from another component (e.g., the sensor module 1476 or the communication module 1490) in volatile memory 1432, process the command or the data stored in the volatile memory 1432, and store resulting data in non-volatile memory 1434.

The processor 1420 may include a main processor 1421 (e.g., a central processing unit (CPU) or an application processor (AP)), and an auxiliary processor 1423 (e.g., a graphics processing unit (GPU), an image signal processor (ISP), a sensor hub processor, or a communication processor (CP)) that is operable independently from, or in conjunction with, the main processor 1421. Additionally or alternatively, the auxiliary processor 1423 may be adapted to consume less power than the main processor 1421, or to be specific to a specified function. The auxiliary processor 1423 may be implemented as separate from, or as part of the main processor 1421.

The auxiliary processor 1423 may control at least some of functions or states related to at least one component (e.g., the display device 1460, the sensor module 1476, or the communication module 1490) among the components of the electronic device 1401, instead of the main processor 1421 while the main processor 1421 is in an inactive (e.g., sleep) state, or together with the main processor 1421 while the main processor 1421 is in an active state (e.g., executing an application). The auxiliary processor 1423 (e.g., an image signal processor or a communication processor) may be implemented as part of another component (e.g., the camera module 1480 or the communication module 1490) functionally related to the auxiliary processor 1423.

The memory 1430 may store various data used by at least one component (e.g., the processor 1420 or the sensor module 1476) of the electronic device 1401. The various data may include, for example, software (e.g., the program 1440) and input data or output data for a command related thereto. The memory 1430 may include the volatile memory 1432 or the non-volatile memory 1434.

The program 1440 may be stored in the memory 1430 as software, and may include an operating system (OS) 1442, middleware 1444, or an application 1446.

The input device 1450 may receive a command or data to be used by other component (e.g., the processor 1420) of the electronic device 1401, from the outside (e.g., a user) of the electronic device 1401. The input device 1450 may include a microphone, a mouse, or a keyboard.

The sound output device 1455 may output sound signals to the outside of the electronic device 1401. The sound output device 1455 may include a speaker or a receiver. The speaker may be used for general purposes, such as playing multimedia or playing record, and the receiver may be used for an incoming calls. The receiver may be implemented as separate from, or as part of the speaker.

The display device 1460 may visually provide information to the outside (e.g., a user) of the electronic device 1401. The display device 1460 may include a display, a hologram device, or a projector and control circuitry to control a corresponding one of the display, hologram device, and projector. The display device 1460 may include touch circuitry adapted to detect a touch, or sensor circuitry (e.g., a pressure sensor) adapted to measure the intensity of force incurred by the touch.

The audio module 1470 may convert a sound into an electrical signal and vice versa. The audio module 1470 may obtain the sound via the input device 1450, or output the sound via the sound output device 1455 or a headphone of an external electronic device (e.g., the electronic device 1402) directly or wirelessly coupled with the electronic device 1401.

The sensor module 1476 may detect an operational state (e.g., power or temperature) of the electronic device 1401 or an environmental state (e.g., a state of a user) external to the electronic device 1401, and then generate an electrical signal or data value corresponding to the detected state. The sensor module 1476 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1477 may support one or more specified protocols to be used for the electronic device 1401 to be coupled with the external electronic device (e.g., the electronic device 1402) directly or wirelessly. The interface 1477 may include a high definition multimedia interface (HDMI), a universal serial bus (USB) interface, a secure digital (SD) card interface, or an audio interface.

A connecting terminal 1478 may include a connector via which the electronic device 1401 may be physically connected with the external electronic device (e.g., the electronic device 1402). According to an embodiment, the connecting terminal 1478 may include, for example, a HDMI connector, a USB connector, a SD card connector, or an audio connector (e.g., a headphone connector).

The haptic module 1479 may convert an electrical signal into a mechanical stimulus (e.g., a vibration or a movement) or electrical stimulus which may be recognized by a user via his tactile sensation or kinesthetic sensation. The haptic module 1479 may include a motor, a piezoelectric element, or an electric stimulator.

The camera module 1480 may capture a still image or moving images. The camera module 1480 may include one or more lenses, image sensors, image signal processors, or flashes.

The power management module 1488 may manage power supplied to the electronic device 1401. The power management module 1488 may be implemented as at least part of, for example, a power management integrated circuit (PMIC).

The battery 1489 may supply power to at least one component of the electronic device 1401. The battery 1489 may include a primary cell which is not rechargeable, a secondary cell which is rechargeable, or a fuel cell.

The communication module 1490 may support establishing a direct (e.g., wired) communication channel or a wireless communication channel between the electronic device 1401 and the external electronic device (e.g., the electronic device 1402, the electronic device 1404, or the server 1408) and performing communication via the established communication channel. The communication module 1490 may include one or more communication processors that are operable independently from the processor 1420 (e.g., the application processor (AP)) and supports a direct (e.g., wired) communication or a wireless communication. The communication module 1490 may include a wireless communication module 1492 (e.g., a cellular communication module, a short-range wireless communication module, or a global navigation satellite system (GNSS) communication module) or a wired communication module 1494 (e.g., a local area network (LAN) communication module or a power line communication (PLC) module). A corresponding one of these communication modules may communicate with the external electronic device via the first network 1498 (e.g., a short-range communication network, such as Bluetooth™, Wi-Fi direct, or infrared data association (IrDA)) or the second network 1499 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1492 may identify and authenticate the electronic device 1401 in a communication network, such as the first network 1498 or the second network 1499, using subscriber information (e.g., international mobile subscriber identity (IMSI)) stored in the subscriber identification module 1496.

The antenna module 1497 may transmit or receive a signal or power to or from the outside (e.g., the external electronic device) of the electronic device 1401. The antenna module 1497 may include one or more antennas, and, therefrom, at least one antenna appropriate for a communication scheme used in the communication network, such as the first network 1498 or the second network 1499, may be selected, for example, by the communication module 1490 (e.g., the wireless communication module 1492). The signal or the power may then be transmitted or received between the communication module 1490 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 1401 and the external electronic device 1404 via the server 1408 coupled with the second network 1499. Each of the electronic devices 1402 and 1404 may be a device of a same type as, or a different type, from the electronic device 1401. All or some of operations to be executed at the electronic device 1401 may be executed at one or more of the external electronic devices 1402, 1404, or 1408. For example, if the electronic device 1401 should perform a function or a service automatically, or in response to a request from a user or another device, the electronic device 1401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1401. The electronic device 1401 may provide the outcome, with or without further processing of the outcome, as at least part of a reply to the request. To that end, a cloud computing, distributed computing, or client-server computing technology may be used, for example.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly, wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, the module may be implemented in a form of an application-specific integrated circuit (ASIC).

Various embodiments as set forth herein may be implemented as software (e.g., the program 1440) including one or more instructions that are stored in a storage medium (e.g., internal memory 1436 or external memory 1438) that is readable by a machine (e.g., the electronic device 1401). For example, a processor (e.g., the processor 1420) of the machine (e.g., the electronic device 1401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 15:
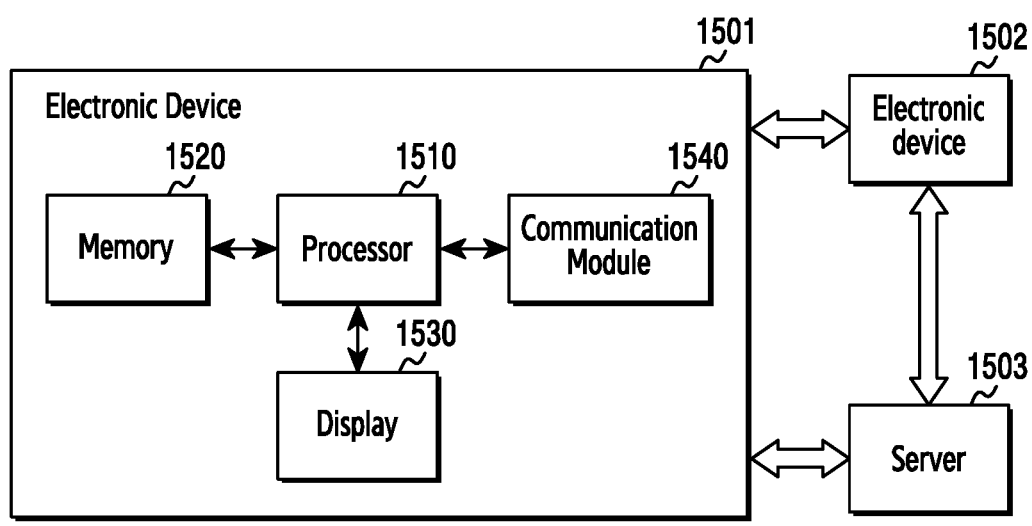
FIG. 15 is a block diagram illustrating electronic devices and a server, according to various embodiments of the disclosure.

FIG. 15 is a block diagram illustrating electronic devices and a server, according to an embodiment of the disclosure.

Referring to FIG. 15, each of electronic devices 1501 and 1502 may include the entire or part of the electronic device 1401 illustrated in FIG. 14. The electronic devices 1501 and 1502 may include one or more processors (e.g., application processor (APs)) 1510 (e.g., the processor 1420), one or more memories 1520 (e.g., the memory 1430), a display 1530 (e.g., the display device 1460) and a communication module 1540 (e.g., the communication module 1490).

The processor 1510 may drive an operating system or an application program to control a majority of hardware or software constituent elements coupled to the processor 1510, and may perform various data processing or other operations. For example, the processor 1510 may generate binary representation of SVG content. In another example, the processor 1510 may render the SVG content.

The processor 1510 may be configured to execute instructions stored in the memory 1520. The memory 1520 may store various data used by at least one component of the electronic device 1501 (e.g., the processor 1510, the display 1530, or the communication module 1540). For example, the memory may store information for generating binary representation of the SVG content and rendering the SVG content.

The display 1530 may visually provide information to the outside (e.g., a user) of the electronic device 1501. For example, the display 1530 may receive a rendered vector data of the SVG content and display the SVG content.

The communication module 1540 may establish a communication connection between the electronic device 1501 and external devices (e.g. the server 1503 or another electronic device 1502), and communicate data with the external device through the communication connection. For example, the communication module may transmit or receive the SVG content, or the information for generating binary representation of the SVG content and rendering the SVG content.

The processor 1510 may generate the binary representation of SVG content as described herein.

The processor 1510 may identify the SVG content for generating binary representation of the SVG content. The SVG content comprises one or more SVG tags and its attributes in the form of text. Examples of SVG tags, attributes and corresponding binary values are shown in Table 1. The SVG content may be included in a SVG file, or a SVG resource. The SVG file or SVG resource may be included in an application. The SVG content may be included in a web page. The processor 1510 may identify the SVG content by loading the SVG file or executing the application. Alternatively, the processor 1510 may identify the SVG content by connecting the web site and loading the web page.

The processor 1510 may identify one or more SVG tags and attributes in the SVG content by parsing the SVG content. For example, the processor 1510 may identify the validity of the SVG file by validating the file format of the SVG file with a standard file format. Upon passing the validity check, the processor 1510 may extract the SVG tags and the attributes in the SVG content by parsing the SVG content in the SVG file. The processor 1510 may identify the SVG tags and the attributes of the SVG content using the extracted SVG tags and attributes in the SVG content.

The processor 1510 may obtain the binary representation of the SVG content by converting each of the identified SVG tags and attributes to the corresponding binary stream. The processor 1510 may use various information stored in the memory 1520 for converting the SVG tags and attributes. Examples of this information are described below.

The processor 1510 may identify dependencies among the SVG tags and attributes in the SVG content using a schema tree. The schema tree defines a relationship among the SVG tags and the attributes to identify dependencies.

The processor 1510 may reorder one or more reference elements in the SVG content using reordering rules to resolve the dependencies among the SVG tags and the attributes. The reference elements in the SVG content provide identity information of the SVG tags and the attributes in the SVG file.

The processor 1510 may map the SVG tags and the attributes to its corresponding binary representation or binary values using the mapping tables. The mapping table associates each of the SVG tags with a corresponding binary stream and each of SVG attributes with a corresponding binary stream.

The processor 1510 may generate data packets including the converted SVG tags and the attributes based on the data packet structures. Examples for the data packet structures are shown in Table 5 to 7. According to an embodiment, the processor 1510 may obtain the binary representation of the SVG content by combining the data packets together.

The processor 1510 may store the binary representation of the SVG content in the memory 1520. The processor 1510 may store the binary representation of the SVG content temporarily in the volatile memory while rendering the SVG content. According to another embodiment, the processor 1510 may store the binary representation of the SVG content semi-permanently in the non-volatile memory. For example, the processor 1510 may generate the BSVG file, wherein the binary representation of the SVG content is included in the BSVG file.

If the SVG content is contained in an application package, the processor 1510 may convert the SVG content in the application package to a corresponding binary representation by repacking the application package. For example, the processor 1510 may identify the SVG content in the application package. The processor may extract the SVG content from the application package. The processor 1510 may identify one or more SVG tags and attributes in the extracted SVG content. The processor 1510 may obtain binary representation of the extracted SVG content. The processor 1510 may include the binary representation of the SVG content in the application package.

In some embodiments of the present disclosure, the binary representation of the SVG content may be included in a format of BSVG file in the application package. In an embodiment, the processor 1510 may repack the application package to include the original SVG file, as well as the BSVG file. In another embodiment, the processor 1510 may repack the application package to exchange the original SVG file to the BSVG file. The processor may also convert the SVG content in the application package dynamically while executing the application or rendering the SVG content.

The processor 1510 may insert a unique signature tag into the binary representation of the SVG content. For example, the processor 1510 may add the unique signature tag on the header of the BSVG file. In various embodiments, the unique signature tag can be used for identifying that the SVG content is in binary representation, or validating the BSVG file.

The processor 1510 may transmit the binary representation of the SVG content to external device. For example, the processor may distribute the binary representation of the SVG content to external electronic device 1502. In another example, the processor may upload the binary representation of the SVG content to the server 1503.

The processor 1510 may render the SVG content as described herein.

The processor 1510 may identify that SVG content is to be displayed. The SVG content may be in a standard (text) form, or in a binary representation. The SVG content may be included in a SVG file or BSVG file. The SVG file or BSVG file can be included in an application. The SVG content may be included in a web page. The processor 1510 may identify the SVG content by loading the SVG/BSVG file or executing the application. The processor 1510 may also identify the SVG content by connecting the web site and loading the web page.

The processor 1510 may identify that SVG content is in the binary representation. For example, the processor 1510 may identify a unique signature tag in the SVG content.

Upon determining that the SVG content is in the binary representation, the processor 1510 may parse the binary representation of SVG content to extract the binary representation of SVG tags and attributes in the binary representation of SVG contents. Examples of the binary representation of SVG tags and attributes are shown in Table 1. The processor may use the data packet structure to parse the binary representation of SVG tags and the attributes.

The processor 1510 may obtain vector data of the SVG content by mapping the binary representation of SVG tags and the attributes to corresponding vector data. Each of the vector data defines a component of the SVG image. For example, the vector data may define a path, a filter, an animation, or etc. According to some embodiments, the processor 1510 may use the mapping tables to map the binary representation of SVG tags and the attributes to corresponding vector data. The mapping table associates each of SVG tags with a corresponding binary stream and each of SVG attributes with a corresponding binary stream.

The processor 1510 may render the vector data of the SVG content. The processor 1510 may interpret each of the vector data to corresponding graphic operation, for example, drawing a path or a figure, adjusting a filter to an image, animating the image, etc.

The processor 1510 may control the display 1530 to display the rendered vector data of the SVG content.

Upon determining that the SVG content is not in the binary representation, the processor 1510 may obtain vector data of the SVG content, by directly parsing the SVG content in text form without converting it to the binary representation.

Upon determining that the SVG content is not in the binary representation, the processor 1510 may generate the binary representation of the SVG content, as well as render the SVG content. For example, the processor 1510 may identify one or more SVG tags and attributes in the SVG content, obtain binary representation of the SVG content by converting each of the identified SVG tags and attributes to the corresponding binary stream, and store the binary representation of the SVG content in the memory.

The processor 1510 may execute an application in the memory 1520, and identify the SVG content in the application package to be displayed. According to some embodiments, the processor 1510 may identify whether the SVG content to be displayed is in the binary representation. Based on identifying that the SVG content to be displayed is in the binary representation, the processor 1510 may obtain the vector data of the SVG content by parsing the binary representation of SVG content, and display the SVG content by rendering the vector data.

Upon determining that the SVG content to be displayed is not in the binary representation, the processor 1510 may convert the SVG content in the application package to a corresponding binary representation by repacking the application package, as well as render the SVG content. For example, the processor 1510 may identify the SVG content in the application package, extract the SVG content from the application package, identify one or more SVG tags and attributes in the extracted SVG content, obtain binary representation of the extracted SVG content, and include the binary representation of the SVG content in the application package.

Upon converting the SVG content in the application package, the processor 1510 may directly obtain the vector data of the SVG content by parsing the binary representation of the SVG content in the application package, instead of parsing the original SVG content. In other words, once the SVG content in the application package is convert, the processor 1510 may bypass to extract the SVG content, to obtain the binary representation of the extracted SVG content, and insert the binary representation of the SVG content into the application package.

The foregoing processes for generating the binary representation of the SVG content and rendering the SVG content may be performed by a single electronic device, or performed separately by a plurality of electronic devices. For example, the binary representation of the SVG content may be generated and rendered in the electronic device 1501. In another example, the binary representation of the SVG content may be generated by the electronic device 1501, transmitted to another electronic device 1502 via the server 1503, and rendered by the another electronic device 1502. The foregoing processes for generating the binary representation of the SVG content and rendering the SVG content may be performed consecutively or separately in time.

The memory may store information for generating binary representation of the SVG content and rendering the SVG content. The information may comprise at least one of the schema tree, the mapping tables, the data packet structures, the custom tag format, the reordering rules, etc. The schema tree defines a relationship among the SVG tags and the attributes. The mapping tables may associate each of SVG tags with a corresponding binary stream and each of SVG attributes with a corresponding binary stream. For example, the mapping tables may define a one-to-one mapping between the SVG tags and the attributes in the SVG file and their binary values. In another example, the mappings table may further associate at least one custom SVG tag or attribute with a corresponding binary stream. Examples of custom SVG tags and attributes are shown in Table 2. The mapping tables may have a structure of a hash table.

The memory 1520 may store the SVG content. The memory 1520 may store SVG files and/or BSVG files including the SVG content, and the application package (e.g., application 1546) including the SVG files and/or the BSVG files.

The display 1530 may receive a rendered vector data of the SVG content and display the SVG content.

The communication module 1540 may transmit or receive the SVG content to/from the external devices, for example, another electronic device 1502 or the server 1503. The communication module 1540 may transmit or receive the SVG file or the BSVG files including the SVG content, or the application package including the SVG files or BSVG files. The communication module 1540 may receive various information for generating binary representation of the SVG content and rendering the SVG content, regarding a schema tree, the mapping tables, the data packet structure, the custom tag format, the reordering rules etc., from the server 1503.

The server 1503 may be connected to the electronic device 1501, 1502 and communicate data with the electronic devices. The server 1503 may store various information for generating binary representation of the SVG content and rendering the SVG content, regarding a schema tree, the mapping tables, the data packet structure, the custom tag format, the reordering rules etc. The server 1503 may transmit the information to the electronic devices. The server 1503 may store the SVG content. For example, the server 1503 may store the SVG files or BSVG files including the SVG content, or the application package including the SVG files or the BSVG files. The server may transmit the SVG content, the SVG/BSVG files, or the application to the electronic devices.

Figure 16:
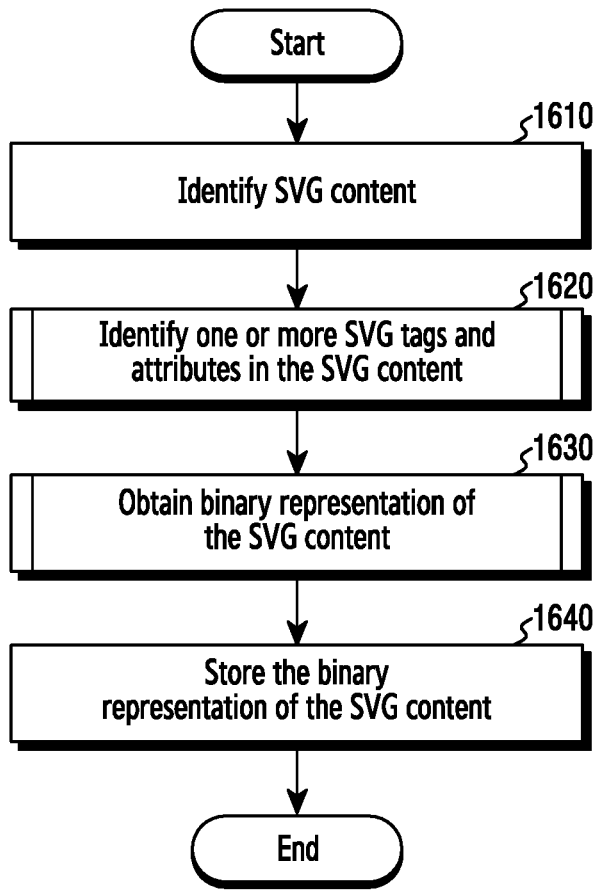
FIG. 16 is a flow diagram illustrating an operation flow of generating binary representation of a SVG content in an electronic device, according to an embodiment of the disclosure.

FIG. 16 is a flow diagram illustrating a method of generating binary representation of SVG content in an electronic device, according to an embodiment of the disclosure.

Referring to FIG. 16, in operation 1610, the processor 1510 may identify the SVG content for generating binary representation of the SVG content. The SVG content comprises one or more SVG tags and its attributes in the form of text. Examples for SVG tags, attributes and corresponding binary values are shown in Table 1. The SVG content may be included in a SVG file, or a SVG resource. The SVG file or SVG resource may be included in an application. The SVG content may be included in a web page. The processor 1510 may identify the SVG content by loading the SVG file or executing the application. The processor 1510 may also identify the SVG content by connecting the web site and loading the web page.

In operation 1620, the processor 1510 may identify one or more SVG tags and attributes in the SVG content by parsing the SVG content. For example, the processor 1510 may identify the validity of the SVG file by validating the file format of the SVG file with a standard file format. Upon passing the validity check, the processor 1510 may extract the SVG tags and the attributes in the SVG content by parsing the SVG content in the SVG file. The processor 1510 may identify the SVG tags and the attributes of the SVG content using the extracted SVG tags and attributes in the SVG content.

In operation 1630, the processor 1510 may obtain binary representation of the SVG content by converting each of the identified SVG tags and attributes to the corresponding binary stream. The processor 1510 may use various information stored in the memory 1520 for converting the SVG tags and attributes. The information may comprise at least one of the schema tree, the mapping tables, the data packet structures, the custom tag format, the reordering rules, etc.

In operation 1640, the processor 1510 may store the binary representation of the SVG content in the memory 1520. The processor 1510 may store the binary representation of the SVG content temporarily in the volatile memory while rendering the SVG content. The processor 1510 may also store the binary representation of the SVG content semi-permanently in the non-volatile memory. For example, the processor 1510 may generate the BSVG file, wherein the binary representation of the SVG content is included in the BSVG file.

Figure 17A:
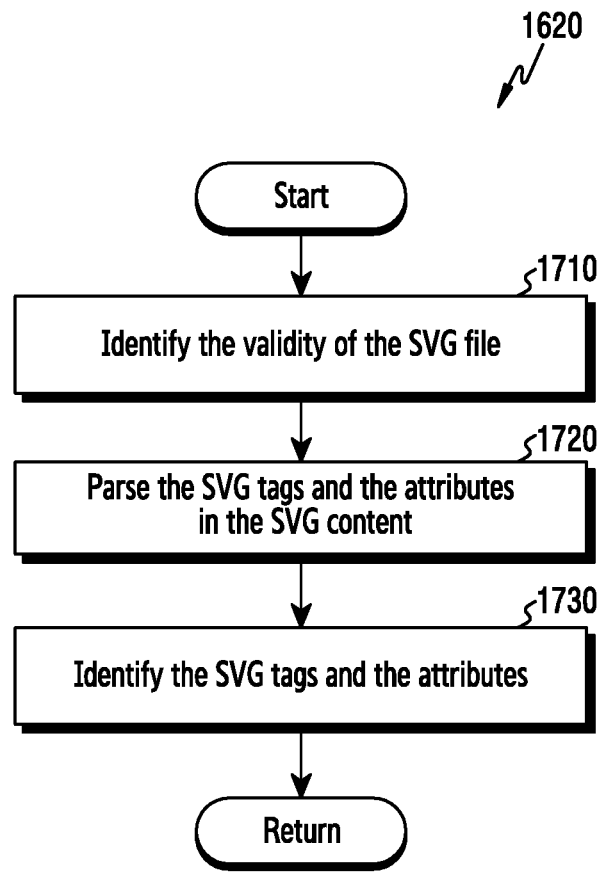
FIG. 17A is a flow diagram illustrating an operation flow of identifying SVG tags and attributes in SVG content, according to an embodiment of the disclosure.
Figure 17B:
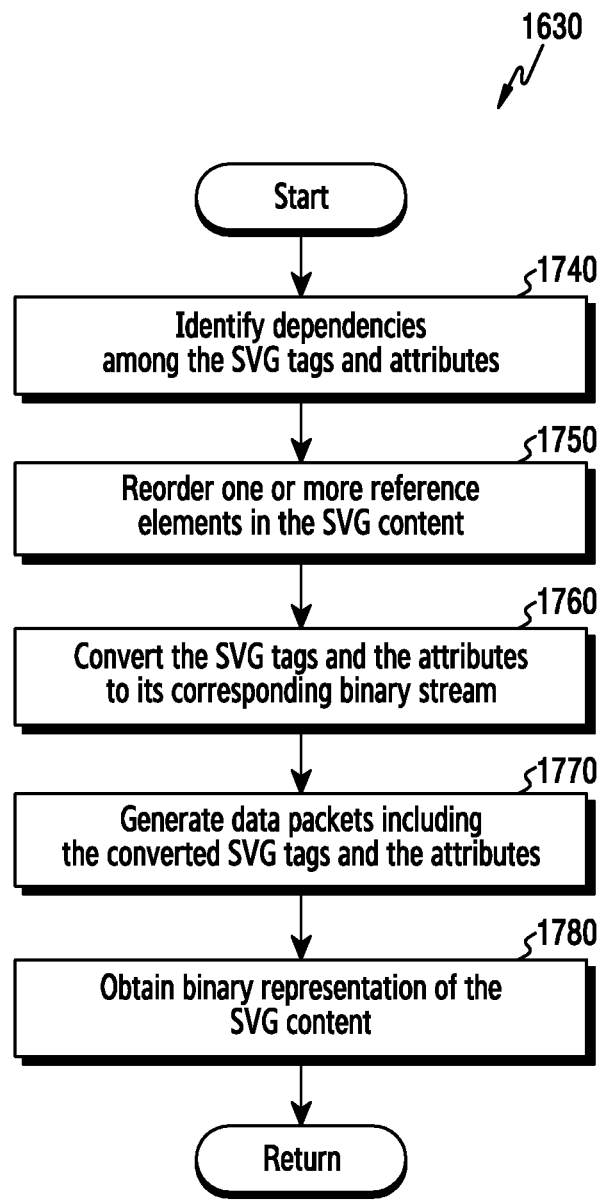
FIG. 17B is a flow diagram illustrating an operation flow of obtaining binary representation of SVG content, according to an embodiment of the disclosure.

FIG. 17A is a flow diagram illustrating a method of identifying SVG tags and attributes in SVG content, according to an embodiment of the disclosure. FIG. 17B is a flow diagram illustrating a method of obtaining binary representation of the SVG content, according to an embodiment as disclosed herein. FIGS. 17A and 17B may be a detailed flow diagram regarding an operation 1620 and 1630 of FIG. 16.

Referring to FIG. 17A, in operation 1710, the processor 1510 may identify the validity of the SVG file by validating the file format of the SVG file with a standard file format. In operation 1720, upon passing the validity check, the processor 1510 may parse the SVG content in the SVG file to extract the SVG tags and the attributes in the SVG content. In operation 1730, the processor 1510 may identify the extracted SVG tags and the attributes of the SVG content. Thereafter, the method flow may return to FIG. 16.

Referring to FIG. 17B, in operation 1740, the processor 1510 may identify dependencies among the identified SVG tags and attributes in the SVG content. The processor 1510 may use the schema tree that defines a relationship among the SVG tags and the attributes to identify dependencies.

In operation 1750, the processor 1510 may reorder one or more reference elements in the SVG content. The processor 1510 may use reordering rules to resolve the dependencies among the SVG tags and the attributes. The reference elements in the SVG content provide identity information of the SVG tags and the attributes in the SVG file.

In operation 1760, the processor 1510 may map the SVG tags and the attributes to its corresponding binary representation or binary values. The processor 1510 may use the mapping tables to map the SVG tags and the attributes. The mapping table associate each of SVG tags with a corresponding binary stream and each of SVG attributes with a corresponding binary stream.

In operation 1770, the processor 1510 may generate data packets including the converted SVG tags and the attributes. The processor 1510 may generate data packets based on the data packet structures. Examples for the data packet structures are shown in Table 5 to 7.

In operation 1780, the processor 1510 may obtain binary representation of the SVG content. The processor 1510 may generate the binary representation of the SVG content by combining data packets. Thereafter, the processor 1510 may return to FIG. 16.

The various actions, acts, blocks, steps, or the like in the flow diagram 1620 and 1630 may be performed in the order presented, in a different order or simultaneously. Further, in some embodiments, some of the actions, acts, blocks, steps, or the like may be omitted, added, modified, skipped, or the like without departing from the scope of the invention.

Figure 18:
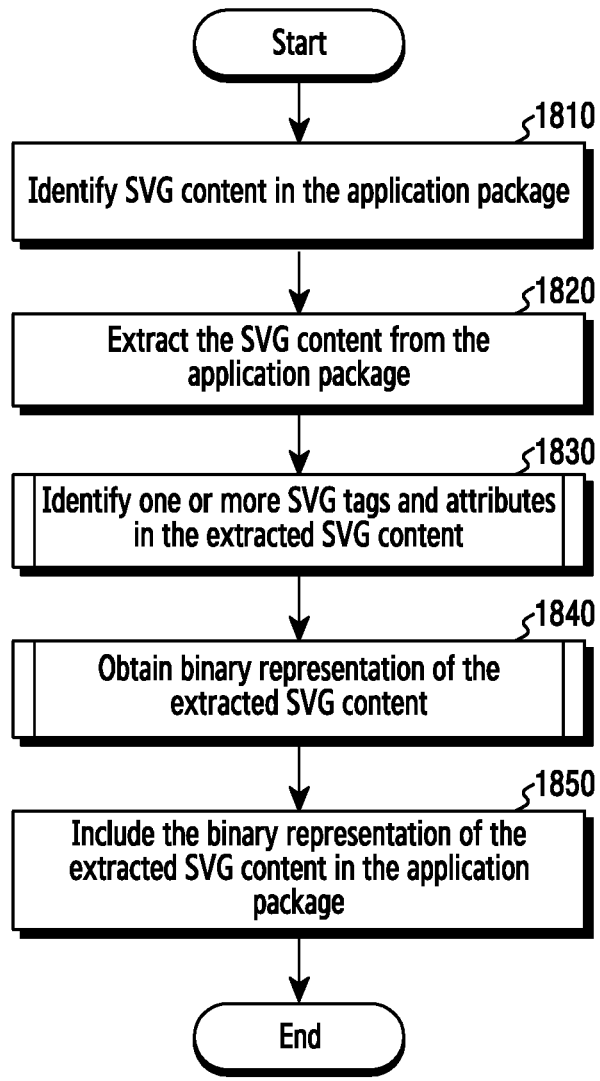
FIG. 18 is a flow diagram illustrating an operation flow of converting SVG content to a corresponding binary representation by repacking the application package in an electronic device, according to an embodiment of the disclosure

FIG. 18 is a flow diagram illustrating a method of converting the SVG content to a corresponding binary representation by repacking an application package in an electronic device, according to an embodiment of the disclosure.

Referring to FIG. 18, in operation 1810, the processor 1510 may identify the SVG content in the application package. In operation 1820, the processor may extract the SVG content from the application package. The processor 1510 may unpack the application package to extract the SVG files or resources in the application package.

In operation 1830, the processor 1510 may identify one or more SVG tags and attributes in the extracted SVG content. The procedure of identifying the SVG tags and attributes may correspond to the detailed operations of FIG. 17A.

In operation 1840, the processor 1510 may obtain binary representation of the extracted SVG content. The procedure of obtaining binary representation of the SVG content may correspond to the detailed operations of FIG. 17B.

In operation 1850, the processor 1510 may include the binary representation of the SVG content in the application package. The processor 1510 may repack the application package to include the original SVG file, as well as the BSVG file. The processor 1510 may also repack the application package to exchange the original SVG file to the BSVG file. The processor may convert the SVG content in the application package dynamically while executing the application or rendering the SVG content.

Figure 19:
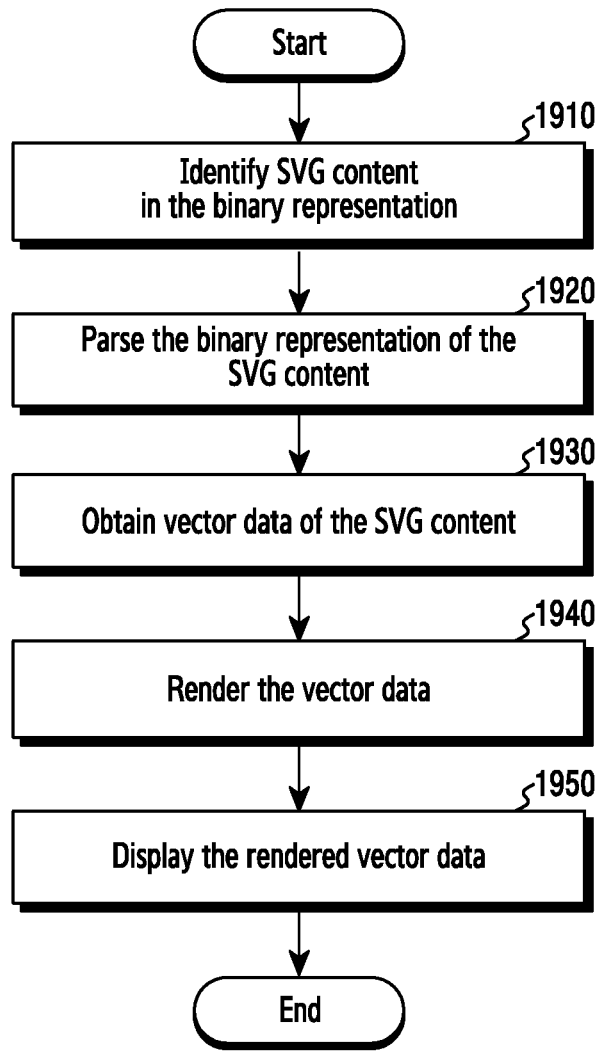
FIG. 19 is a flow diagram illustrating an operation flow of rendering SVG content in an electronic device, according to an embodiment of the disclosure.

FIG. 19 is a flow diagram illustrating an operation flow of rendering the SVG content in the electronic device 1501, according to an embodiment as disclosed herein.

Referring to FIG. 19, in operation 1910, the processor 1510 may identify that SVG content is in the binary representation. In an embodiment, the processor 1510 may identify a unique signature tag in the SVG content.

In operation 1920, based on identifying that the SVG content is in the binary representation, the processor 1510 may parse the binary representation of the SVG content, to extract the binary representation of SVG tags and the attributes in the binary representation of the SVG contents. Examples of the binary representation of SVG tags and attributes are shown in Table 1. The processor may use the data packet structure to parse the binary representation of SVG tags and the attributes.

In operation 1930, the processor 1510 may obtain vector data of the SVG content by mapping the binary representation of SVG tags and attributes to corresponding vector data. Each of the vector data defines a component of the SVG image. For example, the vector data can define a path, a filter, an animation, or etc. The processor 1510 may use the mapping tables to map the binary representation of SVG tags and the attributes to corresponding vector data. The mapping table associates each of SVG tags with a corresponding binary stream and each of SVG attributes with a corresponding binary stream.

In operation 1940, the processor 1510 may render the vector data of the SVG content. The processor 1510 may interpret each of the vector data to corresponding graphic operation, for example, drawing a path or a figure, adjusting a filter to an image, animating the image, etc.

In operation 1950, the display 1530 may display the rendered vector data of the SVG content.

Figure 20:
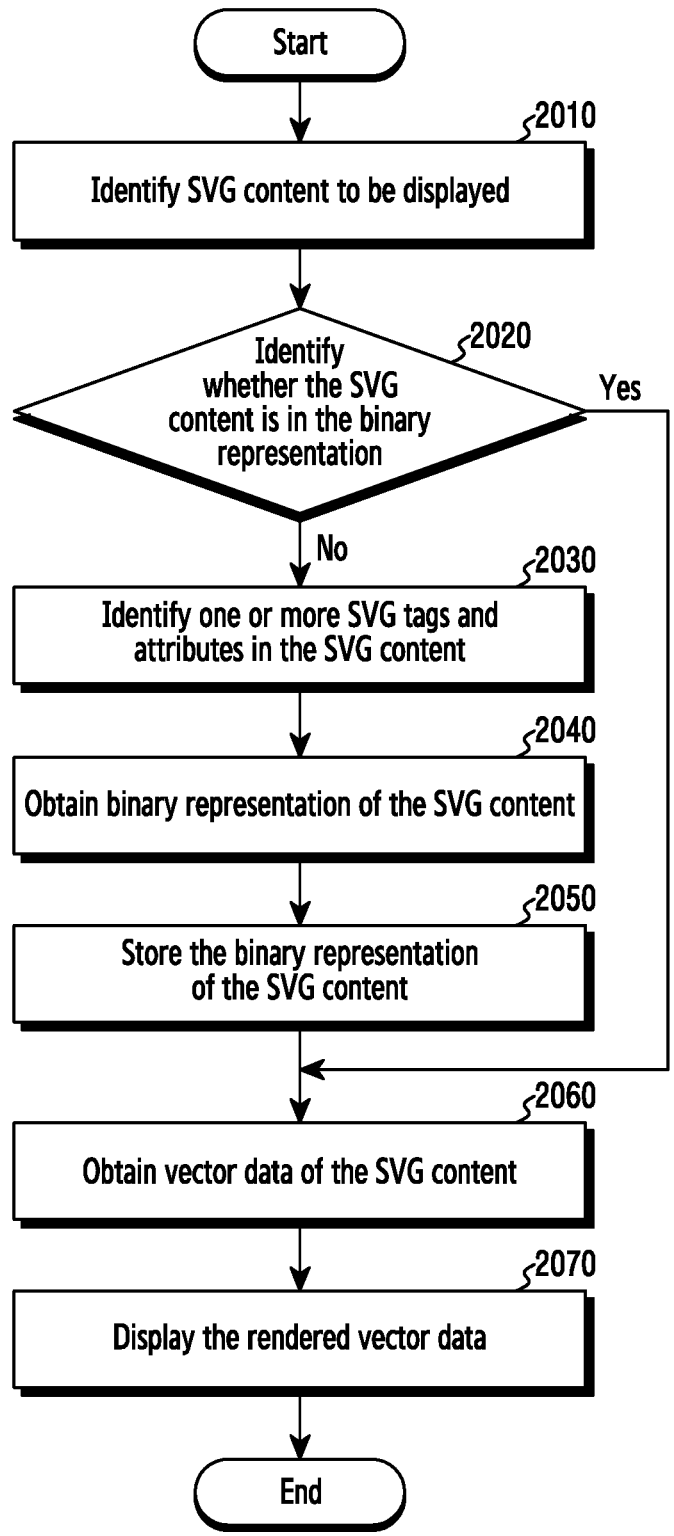
FIG. 20 is a flow diagram illustrating another operation flow of rendering SVG content in an electronic device, according to an embodiment of the disclosure.

FIG. 20 is a flow diagram illustrating another method of rendering SVG content in an electronic device, according to an embodiment of the disclosure.

Referring to FIG. 20, in operation 2010, the processor 1510 may identify that SVG content is to be displayed. The SVG content may be in a standard (text) form, or in a binary representation. The SVG content may be included in a SVG file or BSVG file. The SVG file or BSVG file may be included in an application. The SVG content may be included in a web page. The processor 1510 may identify the SVG content by loading the SVG/BSVG file or executing the application. The processor 1510 may identify the SVG content by connecting the web site and loading the web page.

In operation 2020, the processor 1510 may identify whether the SVG content is in the binary representation. For example, the processor 1510 may identify a unique signature tag in the SVG content.

When it is identified that the SVG content is not in the binary representation, the processor 1510 may generate the binary representation of the SVG content, as well as render the SVG content. In operation 2030, the processor 1510 may identify one or more SVG tags and attributes in the SVG content. The procedure of identifying the SVG tags and attributes may correspond to the detailed operations of FIG. 17A. In operation 2040, the processor 1510 may obtain binary representation of the SVG content. The procedure of obtaining binary representation of the SVG content may correspond to the detailed operations of FIG. 17B. In operation 2050, the processor 1510 may store the binary representation of the SVG content in the memory.

When it is identified that the SVG content is in the binary representation, the processor 1510 may directly obtain vector data of the SVG content, in operation 2060.

In operation 2060, the processor 1510 may obtain vector data of the SVG content. The processor 1510 may parse the binary representation of SVG tags and the attributes in the binary representation of SVG contents. The processor 1510 may map the binary representation of SVG tags and the attributes to corresponding vector data.

In operation 2070, the display 1530 may display the vector data of the SVG content. The processor 1510 may the processor 1510 may render the vector data to display the vector data.

Figure 21:
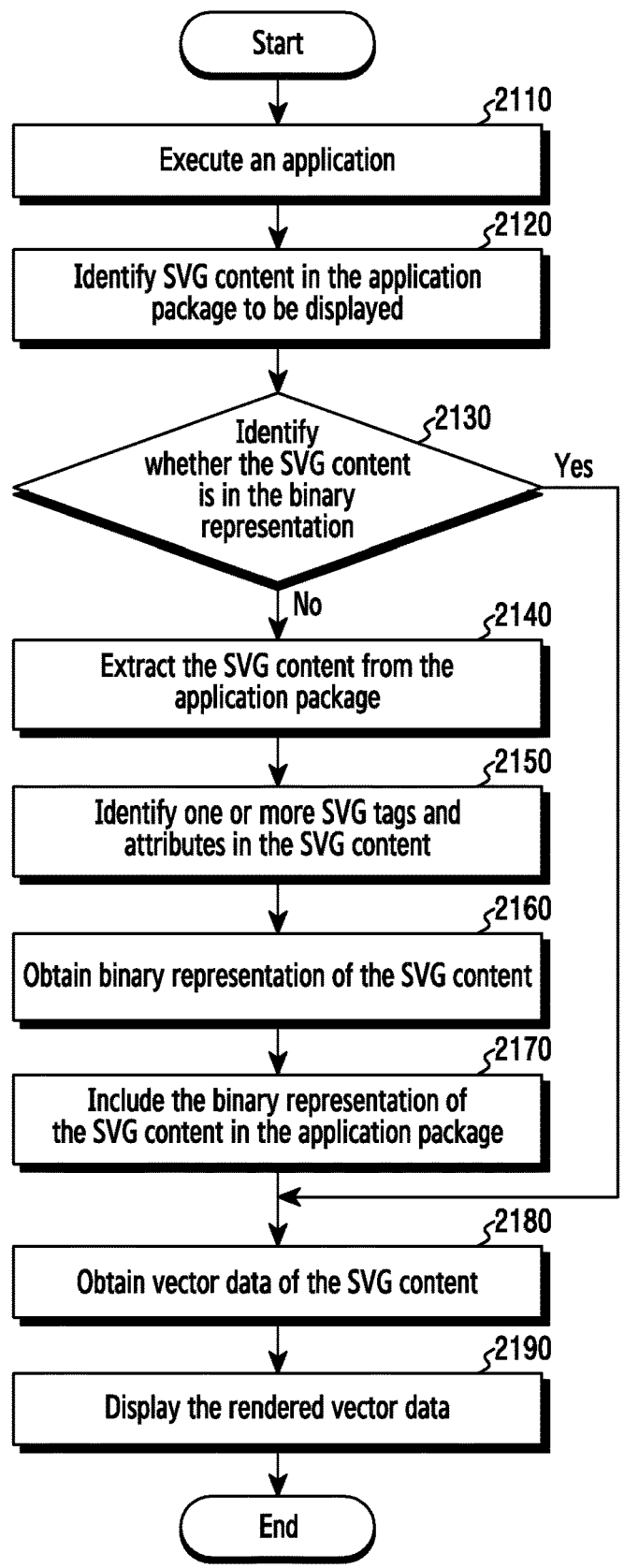
FIG. 21 is a flow diagram illustrating an operation flow of rendering SVG content included in an application, according to an embodiment of the disclosure.

FIG. 21 is a flow diagram illustrating a method of rendering SVG content included in an application, according to an embodiment of the disclosure.

Referring to FIG. 21, in operation 2110, the processor 1510 may execute an application in the memory 1520. In operation 2120, the processor 1510 may identify the SVG content in the application package to be displayed. The SVG content can be in a standard (text) form, or in a binary representation. The SVG content may be included in a SVG file or BSVG file.

In operation 2130, the processor 1510 may identify whether the SVG content to be displayed is in the binary representation. For example, the processor 1510 may identify a unique signature tag in the SVG content.

When it is identified that the SVG content is not in the binary representation, the processor 1510 may convert the SVG content in the application package to a corresponding binary representation by repacking the application package, as well as render the SVG content. In operation 2140, the processor 1510 may extract the SVG content from the application package. In operation 2150, the processor 1510 may identify one or more SVG tags and attributes in the extracted SVG content. The procedure of identifying the SVG tags and attributes may correspond to the detailed operations of FIG. 17A. In operation 2160, the processor 1510 may obtain binary representation of the extracted SVG content. The procedure of obtaining binary representation of the SVG content may correspond to the detailed operations of FIG. 17B. In operation 2170, the processor 1510 may include the binary representation of the SVG content in the application package.

When it is identified that the SVG content is in the binary representation, the processor 1510 may directly obtain vector data of the SVG content, in operation 2180.

Once operations 2140 to 2170 to convert the SVG content are complete, the processor 1510 may determine that the SVG content to be displayed is in the binary representation, in operation 2130. Therefore, the processor 1510 may directly obtain the vector data of the SVG content by parsing the binary representation of the SVG content included in the application package, in operation 2180. In other words, once completing the operations 2140 to 2170 to convert the SVG content in the application package, the processor 1510 may the operations 2140 to 2170.

In operation 2180, the processor 1510 may obtain vector data of the SVG content. The processor 1510 may parse the binary representation of SVG tags and the attributes in the binary representation of SVG content, and map the binary representation of SVG tags and the attributes to corresponding vector data.

In operation 2190, the display 1530 may display the vector data of the SVG content. The processor 1510 may processor 1510 may render the vector data to display the vector data.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   at least one memory storing instructions, a scalable vector graphics (SVG) content, a mapping table, and a schema tree, wherein the mapping table associates each of a plurality of SVG tags with a corresponding binary stream and each of a plurality of SVG attributes with a corresponding binary stream, and the schema tree defines a relationship among the plurality of SVG attributes and the plurality of SVG tags; and
   at least one processor operatively coupled with the memory, configured to execute the stored instructions to:
   identify one or more SVG tags and attributes in the SVG content by parsing the SVG content,
   identify dependencies among one or more SVG tags and attributes in the SVG content using the schema tree,
   reorder one or more reference elements in the SVG content using reordering rules to resolve the identified dependencies,
   obtain a binary representation of the SVG content by converting each of the identified SVG tags and attributes to the corresponding binary stream based on the identified dependencies and the reordered one or more reference elements, and
   store the binary representation of the SVG content in the memory.

2. The electronic device of claim 1, wherein the at least one processor is further configured to execute the stored instructions to:
   insert a unique signature tag into the binary representation of the SVG content.

3. The electronic device of claim 1, wherein the mapping table further associates at least one custom SVG tag or attribute with a corresponding binary stream.

4. The electronic device of claim 1, wherein the SVG content is included in an application package, and wherein the at least one processor is further configured to execute the stored instructions to:
   extract the SVG content from the application package,
   convert the extracted SVG content to the binary representation of the SVG content, and
   include the binary representation of the SVG content in the application package.

5. An electronic device comprising:
   a display;
   a memory storing instructions, a mapping table, and a schema tree, wherein the mapping table associates each of a plurality of scalable vector graphic (SVG) tags with a corresponding binary stream and each of a plurality of SVG attributes with a corresponding binary stream, and the schema tree defines a relationship among the plurality of SVG attributes and the plurality of SVG tags; and
   at least one processor operatively coupled with the memory and the display, configured to execute the stored instructions to:
   determine that a SVG content is not in a binary representation,
   identify one or more SVG tags and attributes in the SVG content,
   identify dependencies among one or more SVG tags and attributes in the SVG content using the schema tree,
   reorder one or more reference elements in the SVG content using reordering rules to resolve the identified dependencies, and
   obtain a binary representation of the SVG content by converting each of the identified SVG tags and attributes to the corresponding binary stream based on the identified dependencies and the reordered one or more reference elements,
   obtain vector data of the SVG content by parsing the binary representation of the SVG content, by using the mapping table and the schema tree, and
   control the display to display the SVG content by rendering the vector data.

6. The electronic device of claim 5, wherein the at least one processor is further configured to execute the stored instructions to:
   determine that the SVG content is in the binary representation by identifying a unique signature tag in the SVG content.

7. The electronic device of claim 6, wherein the at least one processor is further configured to execute the stored instructions to:
store the binary representation of the SVG content in the memory.

8. The electronic device of claim 7, wherein the at least one processor is further configured to execute the stored instructions to:
execute an application package in the memory, the application package including the SVG content, and
convert the SVG content in the application package to the binary representation of the SVG content.

9. The electronic device of claim 8, wherein the at least one processor is further configured to execute the stored instructions to:
extract the SVG content from the application package,
convert the extracted SVG content to the binary representation of the SVG content, and
include the binary representation of the SVG content in the application package.

10. The electronic device of claim 5, wherein the mapping table further associates at least one custom SVG tag or attribute with a corresponding binary stream.

11. A method comprising:
identifying one or more scalable vector graphics (SVG) tags and attributes in a SVG content by parsing the SVG content;
identifying dependencies among one or more SVG tags and attributes in the SVG content using a schema tree;
reordering one or more reference elements in the SVG content using reordering rules to resolve the identified dependencies;
obtaining a binary representation of the SVG content by converting each of the SVG tags and attributes to a corresponding binary stream based on the identified dependencies and the reordered one or more reference elements, wherein the mapping table associates each of the SVG tags with a corresponding binary stream and each of the SVG attributes with a corresponding binary stream, and the schema tree defines a relationship among the plurality of SVG attributes and the plurality of SVG tags; and
storing the binary representation of the SVG content.

12. The method of claim 11, further comprising:
inserting a unique signature tag in the binary representation of the SVG content.

13. The method of claim 11, wherein the mapping table further associates at least one custom SVG tag or attribute with a corresponding binary stream.

14. The method of claim 11, wherein the SVG content is included in an application package, and wherein the method further comprises:
extracting the SVG content from the application package;
converting the extracted SVG content to the binary representation of the SVG content; and
including the binary representation of the SVG content in the application package.

15. A method comprising:
determining that a scalable vector graphics (SVG) content is not in a binary representation;
identifying one or more SVG tags and attributes in the SVG content;
identifying dependencies among one or more SVG tags and attributes in the SVG content using a schema tree;
reordering one or more reference elements in the SVG content using reordering rules to resolve the identified dependencies;
obtaining a binary representation of the SVG content by converting each of the identified SVG tags and attributes to a corresponding binary stream based on the identified dependencies and the reordered one or more reference elements;
obtaining vector data of the SVG content by parsing the binary representation of the SVG content, by using a mapping table and the schema tree, wherein the mapping table associates each of a plurality of SVG tags with a corresponding binary stream and each of a plurality of SVG attributes with a corresponding binary stream, and the schema tree defines a relationship among the plurality of SVG attributes and the plurality of SVG tags; and
displaying the SVG content by rendering the vector data.

16. The method of claim 15, further comprising
determining that the SVG content is in the binary representation by identifying a unique signature tag in the SVG content.

17. The method of claim 16, further comprising:
storing the binary representation of the SVG content in the memory.

18. The method of claim 17, further comprising:
executing an application including the SVG content; and
converting the SVG content in the application package to the binary representation of the SVG content.

19. The method of claim 18, wherein the converting of the SVG content in the application package to the binary representation of the SVG content comprises:
extracting the SVG content from the application package;
converting the extracted SVG content to the binary representation of the SVG content; and
including the binary representation of the SVG content in the application package.

20. A non-transitory computer readable medium configured to store:
a mapping table for generating a binary representation of a scalable vector graphics (SVG) content and rendering the SVG content, wherein the mapping table associates each of SVG tags with a corresponding binary stream and each of SVG attributes with a corresponding binary stream;
a schema tree, wherein the schema tree defines a relationship among the plurality of SVG attributes and the plurality of SVG tags; and
one or more computer programs including instructions that, when executed by at least one processor, cause the at least one processor to control to:
determine that the SVG content is not in a binary representation,
identify one or more SVG tags and attributes in the SVG content,
identify dependencies among one or more SVG tags and attributes in the SVG content using the schema tree,
reorder one or more reference elements in the SVG content using reordering rules to resolve the identified dependencies, and
obtain a binary representation of the SVG content by converting each of the identified SVG tags and attributes to the corresponding binary stream based on the identified dependencies and the reordered one or more reference elements, obtain vector data of the SVG content by parsing the binary representation of the SVG content, by using the mapping table and the schema tree, and control a display to display the SVG content by rendering the vector data.

* * * * *